(12) United States Patent
Mussman et al.

(10) Patent No.: US 8,078,503 B1
(45) Date of Patent: *Dec. 13, 2011

(54) METHODS AND SYSTEM FOR PROVIDING REAL TIME OFFERS TO A USER BASED ON OBSOLESCENCE OF POSSESSED ITEMS

(75) Inventors: David C. Mussman, Omaha, NE (US); Rocco L. Adornato, Omaha, NE (US); Thomas B. Barker, Omaha, NE (US); Ronald A Katz, Los Angeles, CA (US); Gary L. West, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,331

(22) Filed: Sep. 17, 2010

Related U.S. Application Data

(63) Continuation of application No. 12/131,278, filed on Jun. 2, 2008, now Pat. No. 7,822,647, which is a continuation of application No. 10/877,963, filed on Jun. 25, 2004, now Pat. No. 7,386,485, which is a continuation-in-part of application No. 09/505,619, filed on Feb. 16, 2000, now Pat. No. 7,280,979, which is a continuation of application No. 09/038,399, on Mar. 11, 1998, now Pat. No. 6,055,513.

(51) Int. Cl.
 *G06Q 30/00* (2006.01)
 *G06F 17/30* (2006.01)

(52) U.S. Cl. ........... 705/26.7; 705/26.1; 705/26.61; 705/26.64; 705/14.1; 705/14.23; 705/14.25

(58) Field of Classification Search .......... 705/14.1, 705/14.23, 14.25, 26.1–27.2
See application file for complete search history.

(56) References Cited

U.S. PATENT DOCUMENTS

| | | | |
|---|---|---|---|
| 4,799,156 A | | 1/1989 | Shavit et al. |
| 5,532,735 A | | 7/1996 | Blahut et al. |
| 5,592,378 A | * | 1/1997 | Cameron et al. ........... 705/26.62 |
| 5,933,811 A | | 8/1999 | Angles et al. |
| 6,055,513 A | * | 4/2000 | Katz et al. .................. 705/26.41 |
| 6,064,987 A | | 5/2000 | Walker et al. |
| 6,161,059 A | | 12/2000 | Tedesco et al. |
| 6,196,458 B1 | | 3/2001 | Walker et al. |
| 6,216,111 B1 | | 4/2001 | Walker et al. |
| 6,223,163 B1 | | 4/2001 | Van Luchene |

(Continued)

OTHER PUBLICATIONS

"IMRA Ponders retail future shock". Erlick, June Carolyn. p. 11(1). vol. V9. May 22, 1995.*

*Primary Examiner* — Will Allen

(57) ABSTRACT

In a remote communication environment, a method for real-time presentation of information to one or more users accessing one or more websites using an electronic communications device. Various aspects of the method comprise at least the following. Communication is established via the electronic communications device between the user and the website to conduct one or more primary transactions. One or more electronic identifiers associated with the user are obtained. One or more further or additional data elements related to the user are obtained from a third party using the at least one electronic identifier. Based at least on the electronic identifier and the further data element, the information is selected for presentation to the user in real time with the primary transaction. The information is presented to the user in real time with the primary transaction.

20 Claims, 9 Drawing Sheets

U.S. PATENT DOCUMENTS

| | | |
|---|---|---|
| 6,598,024 B1 * | 7/2003 | Walker et al. .................... 705/16 |
| 6,760,727 B1 | 7/2004 | Schroeder et al. |
| 7,016,864 B1 | 3/2006 | Notz et al. |
| 7,280,979 B1 * | 10/2007 | Katz et al. .................... 705/14.1 |
| 7,386,485 B1 * | 6/2008 | Mussman et al. ............ 705/14.1 |
| 7,822,647 B1 * | 10/2010 | Mussman et al. ............ 705/26.1 |
| 2001/0014868 A1 | 8/2001 | Herz et al. |
| 2002/0026351 A1 | 2/2002 | Coleman |
| 2002/0055906 A1 | 5/2002 | Katz et al. |

\* cited by examiner

METHODS AND SYSTEM FOR PROVIDING REAL TIME OFFERS TO A USER BASED ON OBSOLESCENCE OF POSSESSED ITEMS

CROSS-REFERENCE TO RELATED APPLICATIONS

This application is a continuation of U.S. patent application Ser. No. 12/131,278, filed on Jun. 2, 2008, entitled METHOD AND SYSTEM FOR PROVIDING REAL TIME OFFERS TO A USER BASED ON OBSOLESCENCE OF POSSESSED ITEMS, which in turn is a continuation of U.S. Pat. No. 7,386,485, filed on Jun. 25, 2004 and issued on Jun. 10, 2008, entitled METHOD AND SYSTEM FOR PROVIDING OFFERS IN REAL TIME TO PROSPECTIVE CUSTOMERS, which is a continuation-in-part of U.S. Pat. No. 7,280,979, filed on Feb. 16, 2000 and issued on Oct. 9, 2007, entitled METHODS AND APPARATUS FOR INTELLIGENT, PURPOSE-BASED SELECTION OF GOODS AND SERVICES IN TELEPHONIC AND ELECTRONIC COMMERCE, which in turn is a continuation of U.S. Pat. No. 6,055,513, filed on Mar. 11, 1998 and issued on Apr. 25, 2000, entitled METHODS AND APPARATUS FOR INTELLIGENT SELECTION OF GOODS AND SERVICE IN TELEPHONIC AND ELECTRONIC COMMERCE.

The benefit of the filing dates of such patents and applications are claimed to the fullest extent permitted by 35 U.S.C. §120, and the contents of such patents and applications are incorporated herein by this reference as if set forth verbatim herein.

FIELD OF THE DISCLOSURE

Methods and apparatus are provided for effecting commercial transactions at remote locations over communication networks, especially telephonic and electronic commerce transactions. More specifically, the inventions relate to telemarketing and electronic commerce systems, and especially the intelligent product and service selection for proffer to a customer. Most particularly, they relate to the selection and offering of an upsell transaction, namely, where the product or service offered differs materially from the product or service for which the contact was made.

Telemarketing is a well-known form of remote commerce, that is, commerce wherein the person making the sale or taking the sales data is not in the actual physical presence of the potential purchaser or customer. In general operation, a prospective purchaser typically calls a toll-free telephone number, such as an 800 number. The number dialed is associated by the carrier as being associated with the telemarketer, and the dialed number, typically taken automatically from the carrier (long distance) through use of the dialed number identification service (DNIS), is utilized to effect a database access resulting in a "screen pop" of a script on a terminal for the telemarketer. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Typically, the prospective purchaser is responding to an advertisement or other solicitation, such as a mail order catalog or the like, from which the telephone number is obtained.

In a typical telemarketing application, the item for which the caller makes initial contact is the item which is ordered by the customer. In certain instances, attempts are made to sell other goods or services directly related to the product for which contact was made. For example, if the initial contact was for audio recordings from a given singer, the additional offer may relate to yet further recordings from that same singer. Typically, the correlation between the products offered is predefined, and does not vary depending on the caller.

More generally, the term electronic commerce has been utilized in a broad and evolving manner for remote commerce where at least a portion of the customer-to-seller contact is in electronic form. For example, various forms of electronic on-line shopping services exist. Proprietary content providers in a dial-up content or private networks, such as America Online$^{SM}$ (AOL), CompuServe$^{SM}$ and Prodigy$^{SM}$, offer various electronic commerce shopping services themselves and access to shopping services by other vendors. Yet other electronic commerce is conducted on publicly available electronic communication networks, such as the Internet which may be accessed through private networks such as AOL or alternatively through access providers such as Earthlink$^{SM}$, AT&T WorldNet®, Netcom$^{SM}$, or PSI Net$^{SM}$. Currently, many Internet based electronic commerce trading sites exist, are interconnected by the Worldwide Web (WWW).

In certain applications, electronic shopping malls are provided, wherein the potential customer is provided access to a menu or other selection of categories of goods and services. Typically, through the use of a menu-driven selection process, the potential customer may locate a desired good or service, or may be presented with information on the goods or services which are available, though not specifically known to the potential customer. By way of example, the menu-based selection system may initially provide the customer with the option for information regarding car purchases, which when selected, presents options regarding makes of cars, which when selected, provides model information regarding cars of a selected model, which in turn then provides information regarding the selected model, and in certain applications, may then lead to price and the ability data, as well as the ability to indicate a desire to purchase the vehicle or to be contacted regarding it. Various search systems or search engines exist which receive a user's input or search terms, which hopefully provide one or more responses or "hits" identifying potential sources of information regarding goods and services.

One form of offer of goods or services in the realm of electronic commerce are the so-called "push" systems. Typically, a user of a system, such as an on-line information provider, e.g., AOL, or a continuous information provider such as PointCast Network, will "push" a product or service at the user of the system, even though the contact with the system was not necessarily for the purpose of any commercial transaction. Typically, the pushed good or service is provided in a non-targeted manner, that is, wherein the proffer is made to many users irrespective of differences between the users.

The use of telephonic systems to effect commercial transactions is now well known. For example, in Katz U.S. Pat. No. 4,792,968, filed Feb. 24, 1987, and issued Dec. 20, 1988, entitled "Statistical Analysis System for Use With Public Communication Facility", an interactive telephone system for merchandising is disclosed. In one aspect of the disclosure, a caller may interact with an interactive voice response (IVR or ARU) system to effectuate a commercial transaction. For example, the caller may be prompted to identify themselves, such as through entry of a customer number as it may appear on a mail order catalog. In an interactive manner, the caller may be prompted to enter an item number for purchase, utilizing an item number designation from the catalog or otherwise interact with the system to identify the good or service desired. Provision is made for user entry of payment information, such as the entry of a credit card number and type identifier, e.g., VISA, American Express, etc. Options are provided for voice recording of certain information, such as name, address, etc., which is recorded for later processing, or in certain modes of operation, connecting the customer to a live operator for assistance.

In the non-electronic realm, targeted marketing has been utilized in sales efforts. By way of example, targeted marketing such as the mailing or delivery of coupons to potential customers has been made. In certain applications, the selection of customers for receipt of the coupons or other forms of inducement may be based on various factors, such as geographic factors (zip code, zip code plus four, that is the finest zip code based granularity), demographic data, suspected socioeconomic status, or other factors. In yet other applications, targeted marketing is effected through inclusion in specific magazines of selected advertisements or other inducements for perceived segments of subscribers of the periodical.

More recent applications for electronic commerce are described in Katz PCT Publication No. WO94/21084, entitled "Interactive System for Telephone and Video Communication Including Capabilities for Remote Monitoring", published Sep. 15, 1994. In certain aspects, the application provides systems and methods for conduct of electronic commerce over communication networks, such as through the accessing of such resources via an on-line computer service, wherein the commercial transaction may be effected including some or all of dynamic video, audio and text data. Optionally, the system contemplates the interchange of electronic commerce commercial data, e.g., electronic data interchange (EDI) data, where on-line computer services are used by at least certain of the potential purchasers to interface the system, such as is used to access the Internet.

Various point-of-sale product inducement systems have been proposed. While many of the systems use electronics for their implementation, they do not serve to provide remote commerce. Most typically, the primary application for point-of-sale inducement systems are grocery store, coupon targeting systems. For example, Deaton et al., U.S. Pat. No. 5,592,560 is entitled "Method and System for Building a Database and Performing Marketing Based Upon Prior Shopping History". The patent discloses a system principally for use in a supermarket. A check verification database is utilized, which includes a scanner to scan the check to obtain identification information. The identification information is used along with historical information regarding the consumer to dispense a sales promotion at the point of sale to the customers who meet predetermined product purchasing history criteria. Various aspects of promotion are provided. For example, a frequent purchaser who is deemed a "good" customer may be rewarded with certain types of coupons. In one aspect, a targeted marketing feature includes "dissemination of point-of-sale coupons and direct mail coupons based upon scanned data". In this embodiment, information regarding a customer's purchases, such as obtained via the barcode scanner, is reviewed to determine what types of goods the consumer has not purchased, and then attempts to induce them to purchase goods in those different lines. The text provides in pertinent part: "The technique . . . detects whether or not items have been purchased from the meat department, dairy department or deli. Based upon data stored within the computer, the decision is then made as to whether to award a coupon and what type of coupon to award. For example, if the data illustrates that over a period of time a shopper shows a consistent failure to shop at the delicatessen, then when the customer's check identification is scanned into the check reader 119, the processor 110 pulls up the customer's history and generates a coupon to induce the customer to shop at the delicatessen the next time the customer shops. This inducing can be done by providing the customer with a very high valued coupon used only for deli shopping." (column 67, line 64 to column 68, line 10). This system is attempting to sell on the customer's next visit an item outside of the scope of their purchases.

Deaton et al. U.S. Pat. No. 5,638,457 is entitled "Method and System for Building a Database for Use with Selective Incentive Marketing in Response to Customer Shopping Histories". The system is used for entering a customer's identification code, and includes a memory for storing the previous transaction information and a processor for awarding at a point-of-sale occasion incentive signals representative of "specific customer's dollar volume histories prior to the current visit, said inventive signals having different values in dependence upon different volume histories". A printer is then used to print out coupons "redeemable at a future time in order to incent said customer to return to the retail store".

Deaton et al. U.S. Pat. No. 5,201,010 is entitled "Method and System for Building a Database and Performing Marketing Based Upon Prior Shopping History". The patent discloses the use of a database which is reviewed to determine a list of customers who have not shopped at the store since a preselected date. Those persons are then singled out for marketing in an effort to induce them to return to the store.

Deaton et al. U.S. Pat. No. 5,327,508 is entitled "Method and System for Building a Database and Performing Marketing Based Upon Prior Shopping History". The patent discloses a system for utilizing a check reader for identification of a customer, barcode reader for detecting UPC's and then circuitry for determining "predetermined infrequent product purchasing history criteria", which when met, are used to incent the customer to purchase those items deemed infrequently purchased.

Deaton et al. U.S. Pat. No. 5,621,812 is entitled "Method and System for Building a Database for Use With Selective Incentive Marketing in Response to Customer Shopping Histories". It claims a system including a coupon printer for dispensing sales promotion material, "said sales promotion being efficiently directed towards only the class of said customers who meet predetermined shopping history criteria".

Deaton et al. U.S. Pat. No. 5,649,114 is entitled "Method and System for Selective Incentive Point-of-Sale Marketing in Response to Customer Shopping Histories". The patent includes disclosure relating to various forms of identification, such as from a magnetic stripe on a swipe shopping card, a "smart" card or manual input. The system also contemplates in one embodiment "electronic coupons", such as may be stored on a "smart" card. In yet another aspect, the disclosure relates to providing incentives, and then monitoring and recording the response to the incentive. The incentives are then modified based upon either the success or failure criteria. (FIG. 43). In yet another aspect, the system maintains an "incentive list" for a customer based upon a subset of products that meet a preselected purchasing criteria. (FIG. 46). Targeted marketing may be provided based upon the types of products bought by the purchaser or the department in the store from which the products were bought. (column 98, lines 22-26). In one aspect, the incentive items varies based upon knowledge of the consumer, such as the dollar volume spent per week on items. For example, a $2 off coupon may be a strong incentive for a customer who spends $25 a week, but a less significant incentive for a customer who spends $250 a week.

DeLapa et al. U.S. Pat. No. 5,353,218 is entitled "Focused Coupon System". The disclosure relates generally to merchandising systems and more particularly to systems for generating and redeeming product discount coupons. The system is said expressly to be "a focused coupon system . . . which is non discriminatory as to consumer income or minority status and which invites participation by any and all consumers, with consumers being removed from the system only upon prolonged non-use". The purported novelty resides in the inclusion of both identification and coupon information in one bar code, such that the combined information may be read by a single pass over a conventional scanning unit. An initial set of coupons is supplied to a customer. Upon use of at least one of those coupons, a second set may be selected, wherein the second set includes "at least one coupon selected as a function of the coupons the consumer used". The specification states that: "Other consumption related information pertaining to the consumer may be combined with the history of coupon use in order to select coupons to transmit to the customer. This additional information may be obtained by a telephone interview with the consumer or by the consumer completing a survey of questions." (column 3, lines 37-43). The selection of coupons or value may be based on various factors, such as providing a relatively larger coupon for a non-customer, or to target a particular department which had not been utilized by the consumer. (See, e.g., column 5, lines 25-37). A consumer profile database is generated, whether by obtaining data from a survey filled out by the consumer or by a telemarketer prompting the consumer to respond to questions. (See, e.g., column 9, lines 6-26).

Humble U.S. Pat. No. 4,825,045 is entitled "System and Method for Check-Out Counter Product Promotion". A point-of-sale scanner utilizes UPC data to generate a promotion, such as the generation in provision of a coupon to a purchaser.

Schultz et al. U.S. Pat. No. 5,056,019 is entitled "Automated Purchase Reward Accounting System and Method". The Schultz reference relates to a reward based system which utilizes a scanning system for inputting identification and purchase information. A reward book identifying required purchases is provided. Periodic status reports may be provided to potential customers.

Clarke U.S. Pat. No. 5,502,636 is entitled "Personalized Coupon Generating and Processing System". The system generates and processes personalized coupons. The system advises the customers of available coupons for predefined products. Customers advise the system of specific desired coupons. Additionally, the system obtains profile information from the responsive consumers. Redemption of coupons is monitored, and the redemption data may be used to validate original consumer responses and to provide future market research opportunities such as polling responsive customers and to enhance specific coupon databases.

Tai U.S. Pat. No. 4,908,761 is entitled "System for Identifying Heavy Product Purchasers Who Regularly Use Manufacturers' Purchase Incentives and Predicting Consumer Promotional Behavior Response Patterns". Consumers are provided with coupons and "encoding devices", which are peelable, adhesive backed stickers having a barcode identifying the customer. The coupon preferably includes information regarding the item purchased, such as particular goods, price and size. That information is compiled and used in the next integration of the sending of coupons. An initial list of potential customers of the most likely heaviest purchasers is based on a "geo-demographic lifestyle segmentation". (column 4, lines 49-51). The demographic segmentation includes characteristics such as income, profession, sex and age. (column 4, lines 54-55). Fifty homogeneous "clusters" or "segments" of types are developed, and then the neighborhoods throughout the United States are associated with a single cluster. Coupons are then distributed and the redemption monitored through the scanning of the encoding device which includes the identification information.

Off et al. U.S. Pat. Nos. 4,910,672, 5,612,868 and 5,173,851 are entitled "Method and Apparatus for Dispensing Discount Coupons" and "Method and Apparatus for Dispensing Discount Coupons in Response to the Purchase of One or More Products". A discount coupon is provided at a point-of-sale terminal. In one embodiment, the system issues "multiple-trigger" coupons, where the purchase of multiple products of a given type within a category triggers a coupon. Another embodiment prints a "negative" coupon in response to the failure of the customer to purchase a selected trigger item. A third category is a "log-only" operation and a fourth aspect serves to generate an instantly redeemable discount in response to purchases.

The foregoing coupon dispensing systems, by failing to intelligently analyze the available data as to items actually purchased, may generate proposed coupon which are precisely wrong for a customer. For example, rather than attempting to discern that this customer may be a vegetarian based upon the purchases actually made (as indicated, by, e.g., an absence of purchases in the meat department), this system may attempt to sell "hamburgers to Hindus", a useless, if not offensive, effort.

Various systems have been proposed which seek to measure potential customer interest, or provide simple rules for product selection. For example, Cragun et al. (IBM) U.S. Pat. No. 5,504,675 is entitled "Method and Apparatus for Automatic Selection and Presentation of Sales Promotion Programs". A sales promotion program is dynamically selected through use of a neural network depending on factors such as the proximity of a person to the display, number of persons responding to the general attract loop and responses to the specific loop programs. The network can be retrained at regular intervals or in response to sales data or changes in the collected data. See, also, Bezus, U.S. Pat. No. 5,715,399, entitled "Secure Method and System for Communicating A List of Credit Card Numbers Over A Non-Secure Networks".

Hey U.S. Pat. No. 4,996,642 is entitled "System and Method for Recommending Items" and U.S. Pat. No. 4,870,579 is entitled "System and Method of Predicting Subjective Reactions". The Hey patents disclose a system and method of selectively recommending to a user items such as movies sampled by one or more users in the group but not sampled by the selected user. The recommendation is based in part upon the user's previously sampled items and preferably upon the availability of the item to be recommended. By way of example, a system for recommending a video may be based upon the user's reaction to a movie previously watched, and a positive relationship between that movie and the movie to be recommended, as well as availability of the video.

Various implementations of hardware systems for effecting electronic commerce having been proposed. For example, Chelliah, et al. (Broadvision), U.S. Pat. No. 5,710,887, entitled "Computer System and Method for Electronic Commerce", incorporated herein by reference, describes one hardware implementation possibly useable for effecting electronic commerce. Numerous other systems to effect functionalities are known to the art.

Mueller et al. U.S. Pat. No. 5,353,219 is entitled "Suggestive Selling in a Customer Self-Ordering System". A retail store based, touch screen system is used for direct entry by customers of orders. A suggestive selling subroutine displays a screen suggesting items from a primary category in the event that items have not been selected by the customer from a primary category. For example, on a fast food restaurant touch screen order entry system, if the customer has not ordered a drink, but the system otherwise understood that the customer had finished the order entry, would prompt the customer with a display "would you like . . . a refreshing drink?".

Atcheson et al. U.S. Pat. No. 5,583,763 is entitled "Method and Apparatus for Recommending Selections Based on Preferences in a Multi-User System". The system determines selections which a user is "likely to be interested in". This determination is made based upon the user's prior indicated preferences. Various user entered preferences are compared with entries of other users, and users are paired where there are a large number of overlaps in the indicated preferences. The recommended selections are then based upon the as yet nonmatching entries from the paired users.

Johnson U.S. Pat. No. 5,615,342 is entitled "Electronic Proposal Preparation System" and U.S. Pat. No. 5,625,776 is entitled "Electronic Proposal Preparation System for Selling Computer Equipment and Copy Machines". A display provides product information from which the Applicant selects. Based upon the answers, a customized sales presentation is generated. The system selects information from a variety of sources, such as current pricing information and current product information. A personalized proposal is thereby created.

Suzuki U.S. Pat. No. 5,053,957 is entitled "Electronic Cash Register Having Discount Prices Select by Customer Level". An electronic cash register receives as input an indication of a "customer level" which is used to select a price for a specified good. The various customer levels may include differentiations based upon whether the customer is an employee, stockholder or the like.

Suda U.S. Pat. No. 5,481,094 is entitled "Point-of-Sale Terminal". A point-of-sale terminal provides a "package" discount with respect to commodities previously purchased. A scanner monitors items selected and determines whether the package of goods has been purchased. A package may comprise a bundle of goods, such as specified cookies, candies and chocolate or may be in a pair match arrangement, such as a bottle of shampoo and conditioner. Discount prices are then provided if the batch or pair exists within the selected items.

Lockwood U.S. Pat. No. 5,576,951 is entitled "Automated Sales and Services System". A system composes individualized sales presentations for a prospective customer created from various textual and graphical information data sources to match the customer profile. The sales presentations are composed based upon, among others, customer profile information, and sales agent assessment data.

Various financial websites exist which typically permit individual users to access personal account information, typically requiring two items of identification for entry, such as a social security number or customer identification number and password. Typically, in addition to the provision of financial information, such systems permit on-line trading of financial instruments. In one such system, sponsored by Fidelity Investments, denominated WebExpress, a user may provide specific instructions for transactions. If desired, the website may be used, through a hyperlink arrangement, to access further information on financial instruments, such as prospectus information or other historical information. Additionally, the system includes a mutual fund evaluator in which the user is presented with a series of questions relating to specific parameters, such as to the type of fund in which the user is interested, e.g., a growth fund, a growth and income fund . . . , and some measure of their risk averseness. Based upon the user's responses, the system lists various funds deemed to meet those search criteria. However, the system does not provide specific recommendations or optimize the results, but rather, merely lists funds responsive to the criteria selected by the user. Schwab, another financial services provider, also includes an asset allocation module accessible by its website. User entry of information in response to questions (e.g., user's age, years to retirement, risk tolerance, financial goals) is then used to provide a recommended asset allocation, but not specific financial instruments.

Various web-based electronic systems exist wherein some form of item recommendation may be made to the potential purchaser on the user's request. The on-line bookstore AMAZON.COM includes a "Recommendation Center", which is selected as one option by the user. An "instant recommendations" feature makes recommendations based on the user's past purchases at AMAZON.COM. The BookMatcher$^{SM}$ permits user entry of authors and book type (e.g., histories, mysteries) and to indicate whether they like them or dislike them, and the MoodMatcher permits user entry of occasions, whereupon recommendations are made. The Customer Buzz feature identifies titles other customers have reviewed in the greatest number and with the greatest passion. Finally, the "if you like this author . . . " feature permits user entry of author identity, and the system suggests another believed to be of interest to the user.

Yet another deficiency of certain of the prior art systems is in their failure to incentivise the potential customer in real time. Often times, the best time to offer incentives or alternatives for purchases when the customer has already manifested a desire or interest to purchase. Despite the efforts made over a significant period, an effective, useful system for the intelligent, automated provision of goods and services in the telephonic and electronic commerce areas has been made.

SUMMARY OF THE DISCLOSURE

Apparatus and methods are provided for effecting remote commerce, such as in telemarketing (either inbound or outbound) and in electronic commerce, which are particularly adapted for the intelligent selection and proffer of products, services or information to a user or customer. In one implementation of the invention, the system and methods obtain input information for the system from a primary transaction, identify one or more goods or services for possible proffer and upsell to the customer based at least in part upon the primary transaction data information provided to the system, and thereafter, offer the user or customer one or more items determined to be among the optimum upsells.

In one aspect of the invention, a method provides offers of an item constituting a good or a service in the form of an offer for purchase of the item to potential customers as users of the system, utilizing an electronic communications device, such as a telephone, videophone or computer, comprising the steps of, first, establishing communication via the electronic communications device between the user and the system for purpose of a primary transaction, second, obtaining primary transaction data with respect to the transaction, including determining the identity of the prospective customer, third, obtaining at least a second data element relating to the user for the upsell determination, fourth, utilizing at least in part the primary transaction data and the second data element and determining at least one good or service item for prospective upsell to the prospective customer, and fifth, offering the item to the prospective customer.

In the preferred implementation of the inventions, the input information for the system includes primary transaction data and at least a second data element obtained from a database, especially a remote, third party database or databases. Primary transaction data may include data relating to or reflecting the initial or primary contact from the customer to the system. In operation, one or more databases may be accessed, either in parallel or series, to collect and assemble input information for the system to determine the upsell or intelligent product selection.

One example of primary transaction data includes transaction determining data, which provides an indication of the purpose of the call, for example, whether the primary contact was for purchase of a product, for a service request or an inquiry. Such transaction determination data may either be used to consummate the primary transaction or not. By way of example, a user initiating remote contact with a source of sales or services might initially contact the source desiring repair of a defective product, whereupon the transaction determination data indicating a repair contact may then be used as an input to the system identifying responses to be proffered. In such a circumstance, while the primary transaction data reflect a service contact, the customer may be offered in response a sales transaction for a new product which includes the functionalities of the product which formed the basis for the primary transaction.

Yet another aspect of primary transaction data may include customer identification data. Such data may be specific data in that it uniquely identifies the contact, such as in person specific data comprising an electronic address, an e-mail address, customer number, billing data or credit card number. Customer identification data may in some instances be less than person specific data, such as residence specific data. For example, a caller's telephone number, such as may be automatically supplied by the automatic number identification (ANI) service or other forms of caller identification, may identify a customer to the level of a residence. Optionally, additional data may be requested so as to specify a subset, e.g., a unique resident, from the household. At yet a less specific level of geographic granularity, identification data may include zip code data or other geographic identifier. Identification data may be obtained automatically from a carrier, such as through the use of ANI for telephonic communications, or through an electronic identifier for electronic commerce, such as transactions over the Internet. Alternatively, nonautomatic entry may be utilized, such as where the customer or operator effects data entry. Further examples of customer identification data, or electronic identifiers for electronic commerce, might include "cookies", which are small text files stored on client systems after visits to a website. The cookies could contain data identifying either a specific user, or identifying a given computer system accessed by given users. One non-limiting example of such a website could include a home page for an Internet search engine. Customer identification data, or electronic identifiers for electronic commerce, can also be obtained directly from the user during a registration, enrollment, or login function by which the user become qualified to receive either basic or enhanced services associated with a website. Information from the registration, enrollment, or similar processes can be stored in profiles for later reference.

Yet further aspects of the input information for the system may include a correlation system for matching primary transaction data or other input data with a corresponding or keyed designator number for obtaining yet further input information. For example, while an initial contact to a telemarketer may automatically obtain the caller's telephone number, such as from ANI, a correlation system may then provide a designator, such as a social security number, which may be utilized as an index or key for accessing yet further data bases or sources of information. For example, a caller's telephone number as provided as primary transaction data via ANI may through the correlation system result in a social security number or credit card number which may then be used to determine the credit worthiness of the caller from a database check. The collection of input information for the system may be effected based upon local resident databases, such as a telemarketer's database, or through use of third party databases, such as credit card or credit worthiness databases, or possibly, a combination of both local and remote databases. Any form or content for a local or remote database may be utilized which is consistent with the goals and objects of the invention.

Beyond credit databases and identification databases, numerous other options may be utilized. A demographic database may be utilized to identify direct or predicted attributes of the customer. Specific input information regarding the customer, such as age, sex, income, profession, education level, family status, lifestyle, and/or interests, may be used as separate and discrete inputs, or may be effectively combined to provide a coded designator based upon demographics, socioeconomic analysis or otherwise to provide a coded designator. A third party database provider, such as a credit card issuer (e.g., Visa, MasterCard, American Express), may not wish to provide specific, raw data with respect to a user, such as where they would specifically identify a customer's income as may be known to the credit card issuer through the credit application. In such circumstances, processed data may be provided such as through the use of the coded designator, previously mentioned. In this way, the third party database may provide responsive, effective information for the upsell determination, but yet preserve in confidence the specific details known to it regarding the user which is a customer of both the upsell service and the credit card company. Yet another type of third party database may include subscription information, such as telephone services subscription information as maintained by telephone companies or other carriers. Such information may include the types of service, such as call waiting, three-way conferencing or the like.

Yet another possible input to the system includes inventory data. Such data serves to minimize or preclude the offering of goods or services to a potential customer which are not then available, or which will not be available in a timely manner. Such inventory information may be used in a positive manner, such as an input for possible offers of an upsell, or in a negative manner, such as where a potential upsell has been determined but is then deleted from the possible proffers based upon its undesirable inventory status.

Yet another class of database information may include third party databases relating to items believed to be possessed by or desired by the customer. For example, a possession database may indicate that the system user possesses a certain formal ware pattern, or has a certain number of place settings of a pattern. The status information regarding the possession and/or completeness of a set may be utilized as an input to the system to identify an upsell to the customer. In yet another aspect, a registry database which reflects desired goods or services may be consulted as yet further input information for the system for identifying the proffer.

The system for identifying the potential proffer utilizes the input information so as to generate one or more outputs comprising potential proffers to the user. Various selection methodologies are available, including historical selection criteria keying the proffer to what has effectively resulted in sales or successful transactions in the past, or proffers based upon demographic profile or other inputs as a designator for a potential upsell. In yet other selection methodologies, theme sales may be utilized such as where further goods are required to complete a set, such as a formal ware set.

In yet other aspects, the invention may include actions taken upon the historical factors relating to a specific customer or customer type. For example, the system may adapt to reduce the number or frequency of upsells if it is determined that the customer is unlikely to purchase, or a pattern or time basis to the customer's purchasing is detected or expected. Yet another historical factor may include a quality factor, such as where it has been determined or assumed that the customer is interested in a certain level of quality, and accordingly, the selection of the proffer is based in part upon the quality. In yet another aspect based upon historical factors for a specific customer, knowledge of a user's possession, such as based upon a prior purchase, may be utilized in the proffer. For example, where a computer sales entity possesses the knowledge that the customer owns a particular model of computer, that information may be utilized in the selection of a proffer, such as in the offer of increased computer memory, a new version of a software application or the like. Yet another historical factor may include obsolescence of possessed materials, such as through the passage of time whereby the possessed item becomes worn, outdated, or outgrown.

In the electronic commerce and website context, the above historical factors that are associated with given users may include, for example, data representing key word searches previously performed by given users on search engine websites, or data provided by users when enrolling or registering for either basic or enhanced services provided by such websites. This data representing such historical factors (e.g., previous keyword searches) could reside on either the client end or the server end of the system, assuming an implementation of the well-known client-server network protocol. The various forms of historical data or factors could be considered severally or in combination to determine the item, information, or results to be presented to the user, and also to determine the ranking, order of, or mode in which such item, information, or results are presented.

Yet other factors affecting the upsell may be based beyond those particular to the user. For example, proximity to key calendar events for others, birthdays, anniversaries or other typical gift giving days, may be utilized as a factor in the selection of the upsell. Further, the time of the contact may be utilized, such as where a user contacts the system during the nighttime, wherein an upsell more likely to sell to a 'night owl' will be offered as opposed to what is believed to effectively sell to a 'morning person'. Offers may vary based upon day of the week, or day of the month, such as correlation or actual or expected paydays.

In one aspect of the invention, multiple actions may be taken in one transaction. For example, while a credit verification is being effected for a primary transaction, a second credit check may be performed to determine available credit, which is in turn used as an input to the upsell determination system. In yet another aspect, multiple upsells may be selected, whereby multiple potential purchases are offered to the user either simultaneously or serially, and if serially, the reaction to an earlier offer may be utilized in the decision for subsequent offers.

After the upsells have been identified, they are offered to the user. In the telemarketing application, a script directed towards the sale of the selected product is provided to the telemarketing representative. In an electronic commerce environment, a display or other communication of the offer is made, such as through textual data, video, and/or audio communication. Additionally, information may be provided by additional or other modes of communication, such as e-mail, facsimile, independent phone contact, cable contact, etc. The proffer is typically accompanied by a solicitation to consummate the transaction. The results of the proffer response thereto may be utilized in the modification or updating of the system for identifying later upsells.

In one aspect of this invention, a method is provided for presentation of information to users of an electronic system comprising the steps of, first, establishing communication between a user of the system and the electronic system, second, determining characteristics of the user based at least in part upon the communication between the user of the system and the electronic system, third, determining the mode of presentation for the user based at least in part on the determined characteristics of the user, and fourth, presenting the information to the user in the determined mode.

In yet further aspects of the consummation of either or both of the primary transaction or the derivative, upsell transaction, an order fulfillment system may be utilized. Upon receipt of indication that the transaction is to be consummated, the system may so designate the product, and may automatically provide for shipping and billing of the user. Optionally, tracking of the item may be included.

In operation, a user establishes communication with a telemarketer (either with the user establishing communication in an inbound environment or with the telemarketer establishing communication in an outbound environment) or through other electronic contact, such as through a website contact or hit, upon which identity information regarding the user is either automatically obtained such as through the use of ANI or manually obtained, such as through entry of identification information by the user. Examples of website contacts or hits can include Internet users directing their web browser software to a URL associated with the home page of any one of a number of commercially available Internet search engines. Further, by analyzing the various data as taught herein, a given user may be characterized or classified as a "shopper" or "researcher" (i.e., one who is actively investigating a product or service, but not yet ready to buy), or a serious buyer. The former may be more interested in sites rich in information, while the latter may be more interested in retail or other merchant-specific sites. The latter may also be diverted selectively to live operators. The identity information may be specific to the user, or may be more generalized such as information relating to the type of primary transaction or interaction. A second data element is then obtained, preferably from a second, and most preferably remote, database which is then used in conjunction with the primary transaction or primary interaction data so as to select a subset of potential of offers of goods, services or information to the user. Upon selection, the goods, services or information are provided to the user, and if the interaction is for the purpose of sale, the transaction is preferably consummated. In the preferred embodiment, inventory checks for the proposed offer, as well as a credit authorization for the proposed offer, are made during the course of the communication, and most preferably, prior to the offer of the secondary item. In yet another aspect, the inventions relate to the intelligent selection and proffer of goods, services or information based upon an initial contact generating at least partial identification data, utilizing a remote, external database to develop yet further identification or information respecting the user, utilizing the collected information in the selection of the good, service or information to be provided to the user, and providing the same to the user. In the search engine context, "information" provided to the user can include, for example, search results, or offers for goods/services that are presented in connection with such results. The search results and/or the offers for goods/services presented therewith can be intelligently and dynamically selected for particular given users based on the teachings herein, as opposed to presenting the same static results or offers to different users who may submit similar keywords or search terms. In one application, a user is identified during the course of a primary transaction, and identification information is utilized in an access of a credit card database, whereby raw, processed or coded designator information is obtained from the credit card provider, wherein the information is utilized in the selection of the further good service or information to be provided to the user. In yet another aspect of this invention, the mode of presentation of the information to the user is based at least in part upon the identification information respecting the user. The mode of presentation may be varied based on demographic information, such as age, sex, income, occupation, education level, family status, lifestyle or interests.

In yet another aspect of this system, an electronic system permits the user of a web or other electronic commerce system to interact with a live operator. In this way, what has heretofore been merely communication between a user and a non-human system may divert the transaction to an operator/transaction assistant.

In yet another aspect, the method comprises obtaining data of a transaction initiated by a user for a purchase of a first good or service upon receiving a search for the first good or service in a search engine, generating an offer for sale of a second good or service to the user based on the data relating to an identity of the user and an obsolescene of the first good or service measured by passage of time, and presenting the offer for sale to the user during a course of the transaction.

In yet another aspect, the system comprises an interface for receiving a transaction from a user for purchase of a first good or service based on a search conducted using a search engine, a collection system for collecting data of the transaction relating to the user and the first good or service, an upsell determining unit for determining at least one offer for sale of a second good or service for the user based on the data relating to the identity of the user and an obsolescence of the first good or service based on a passage of time, and a communication system for offering the second good or service to the user during a course of the transaction.

It is an object of this invention to provide an effective, automated commercial transaction system.

It is yet a further object of this invention to provide an intelligent, automated system for electronic commerce to provide suggested purchases of goods or services.

It is yet a further object of this invention to provide methods and apparatus to increase the probability and profitability of commercial transactions.

It is yet a further object of this invention to provide systems and methods to optimize or enhance customer or user satisfaction.

It is yet a further object of this invention to provide essentially real-time (during the course of a telephone call or contact) selection and offer of goods and/or services.

DETAILED DESCRIPTION OF THE INVENTION

Figure 1:
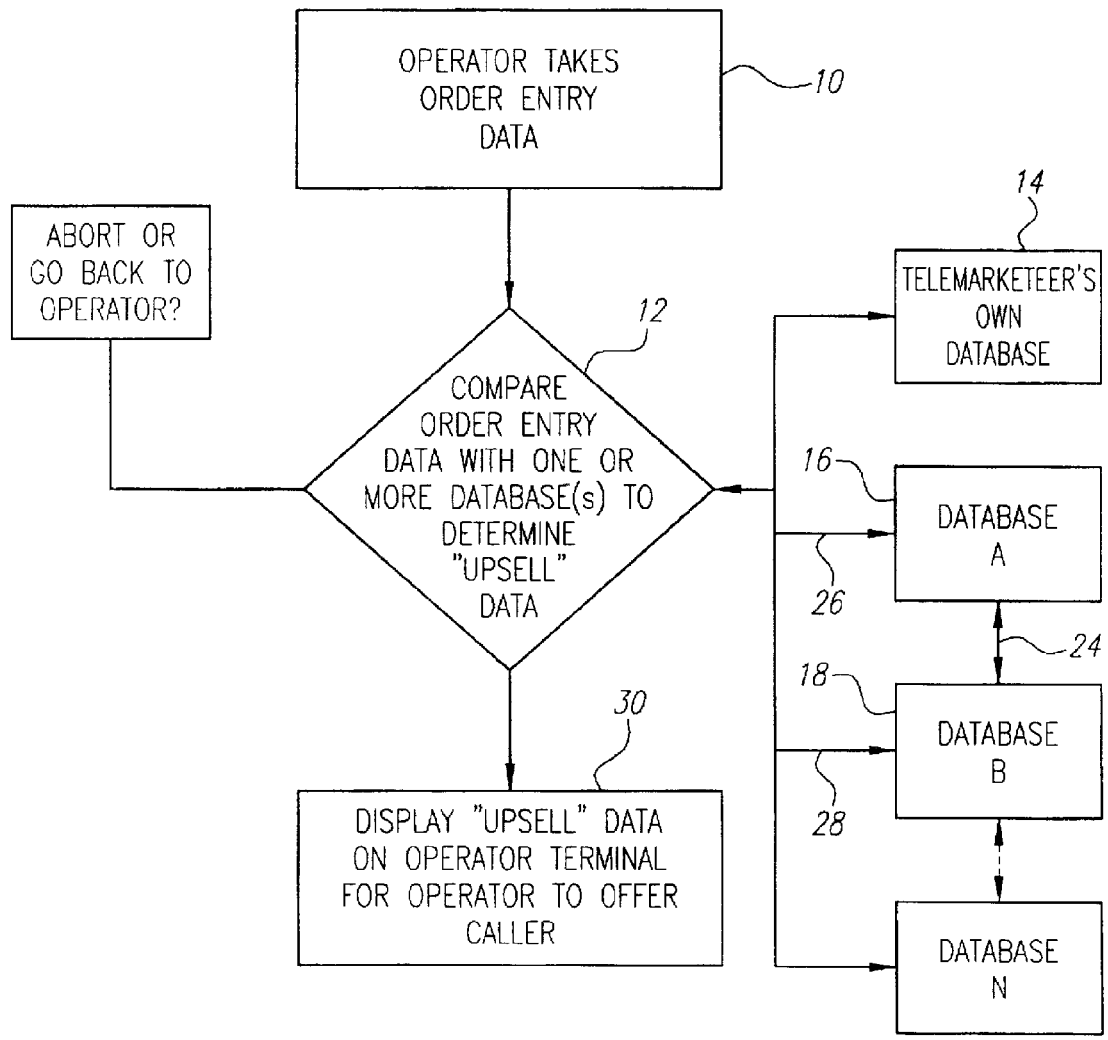
FIG. 1 is a simplified flowchart demonstrating aspects of the upsell system.

FIG. 1 shows a hybrid block diagram and flowchart of one implementation of the system and methods of these inventions. The simplified depiction of FIG. 1 reflects aspects of a telemarketing implementation, though it will be understood that various structures and functionalities may be extended to other implementations, such as electronic commerce and the like.

By way of terminology, when the terms "user", "system user", "customer", "potential customer", "contact" or equivalent terminology is used, those terms are meant to refer to a person or entity to whom the efforts of the offering are at least in part directed. Variations in meaning as to this terminology may be taken from context, as necessary. The terms "good(s)" and "service(s)" while distinct, are intended within the scope of the patent to be used interchangeably, where appropriate given the context. When appropriate from context, a good or service may include a coupon, ticket, card or other promotional material, including printed material, having a value designator. The term "upsell" means an offer or provision of a good or service which is selected for offer to the customer and differs from the good or service for which the primary contact was made. The term "upsell" is not limited to the context in which a primary transaction is intended to be a sales transaction, but additionally includes the offer of a good or service offered in accordance with the selection criteria of the invention even if the primary transaction is not principally sales motivated, such as where an initial contact is for service or repair purposes. The use of "he" is gender neutral, and may be read as "he", "she" or "it". When the term "and" or "or" is used, they may be read in the conjunctive or the disjunctive, where appropriate from context.

Initially, a system user contacts the system for purpose of a primary transaction. As explained, however, the transaction need not be a consummated transaction. If the system user is a potential customer contacting a telemarketing system, at action (statement) block 10 a telemarketing operator may interact with the potential customer and take the order entry data for the primary transaction. Either upon completion of the primary transaction, such as through consummation of a sale or by program flow to further action prior to consummation of a sale, action (decision) block 12 is arrived at wherein data, such as order data or other primary transaction data is compared to one or more databases for analysis. The primary transaction may be a contact for a sale or other commercial transaction, a service or repair transaction or interaction, or may be for the purpose of an inquiry.

As depicted, a first database 14 coacts with action block 12. Typically, the database 14 is a locally resident database, such as the telemarketers own database. It should be understood that a locally resident database refers to any database configured for any access by the telemarketer, not necessarily one that is located at the telemarketer's site. Database 14, if a resident database, may handle matters requiring relatively quicker response, such as correlating automatic number identification (ANI) information received over the telephone or communication network with other identification or prior transaction information on the caller.

One or more other databases (database A-database N), such as database A 16 and database B 18 may be coupled to action block 12. As depicted, database A 16 is coupled via coupling path 24 to database B 18. Additionally, coupling path 26 interconnects action block 12 and database A 16. Similarly, action block 12 is coupled to database B 18 via coupling path 28. Any of the databases 14, 16, 18 may be interconnected as desired consistent with the intended functionalities of the systems described herein. Thus, though not expressly shown, the resident database 14 may couple to database B 18, either directly or via a path such as through action block 12 to coupling path 28, or via action block 12, coupling path 26, database A 16 and coupling path 24. These databases may be accessed simultaneously, or in any combination of parallel, serial, sequential or time access. Preferably, the accessing of multiple databases is performed in a manner to minimize any delay in effecting a real-time proffer to the user.

Secured communications are preferably utilized within some or all of the system. For example, encrypted messages or data may be utilized, such as when transmitting raw or analyzed data from, to or between data bases. Further, privacy concerns are addressed by precluding or inhibiting the sharing of information between users, or between various database owners or content providers. Further, security qualification or entitlement restrictions may be utilized such as to the entire system, or parts of the system, such as databases.

Sources of input information for the system, such as primary transaction data and other input data for the upsell identifying system may come from any or all of action block 10, or other databases 14, 16 and 18. It will be understood by those skilled in the art that the number and interconnection of the various databases 14, 16 and 18 has been simplified for expository convenience, and is not intended to be a limitation on the scope or teaching of the invention. From action block 12, after the system identifies one or more upsell items for offering to the potential customer, offering block 30 serves to provide the selected items to the potential customer. In the telemarketing application, the telemarketer would at this stage have text or other information available to provide to the customer. Typically, a screen pop including a text directed towards the sale of the upsell item would appear, at which point, the telemarketing sales representative would verbally make the sales presentation to the caller.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein. By way of example, while routing of telephone calls and computer-based call handling have historically been relatively discrete, segregable functions, and further segregable based upon discrete equipment, the trend is towards integration and distribution of functionality more broadly within a system. Accordingly, the understanding of the inventions herein should be based upon the functionality, as implemented by selected structures, though not necessarily upon which particular unit of structure in which the functionality resides.

Figure 2:
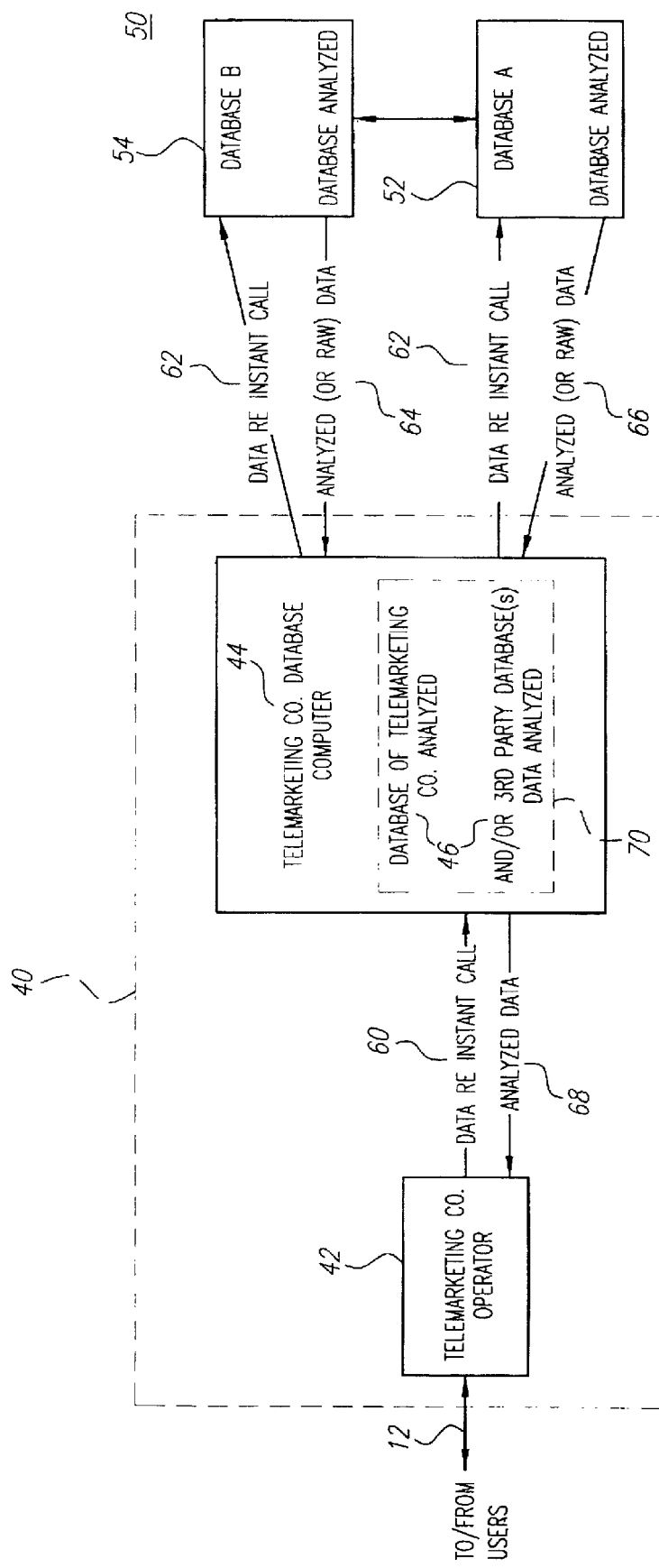
FIG. 2 is a block diagram of a system for implementing the methods of this upsell system.
Figure 3:
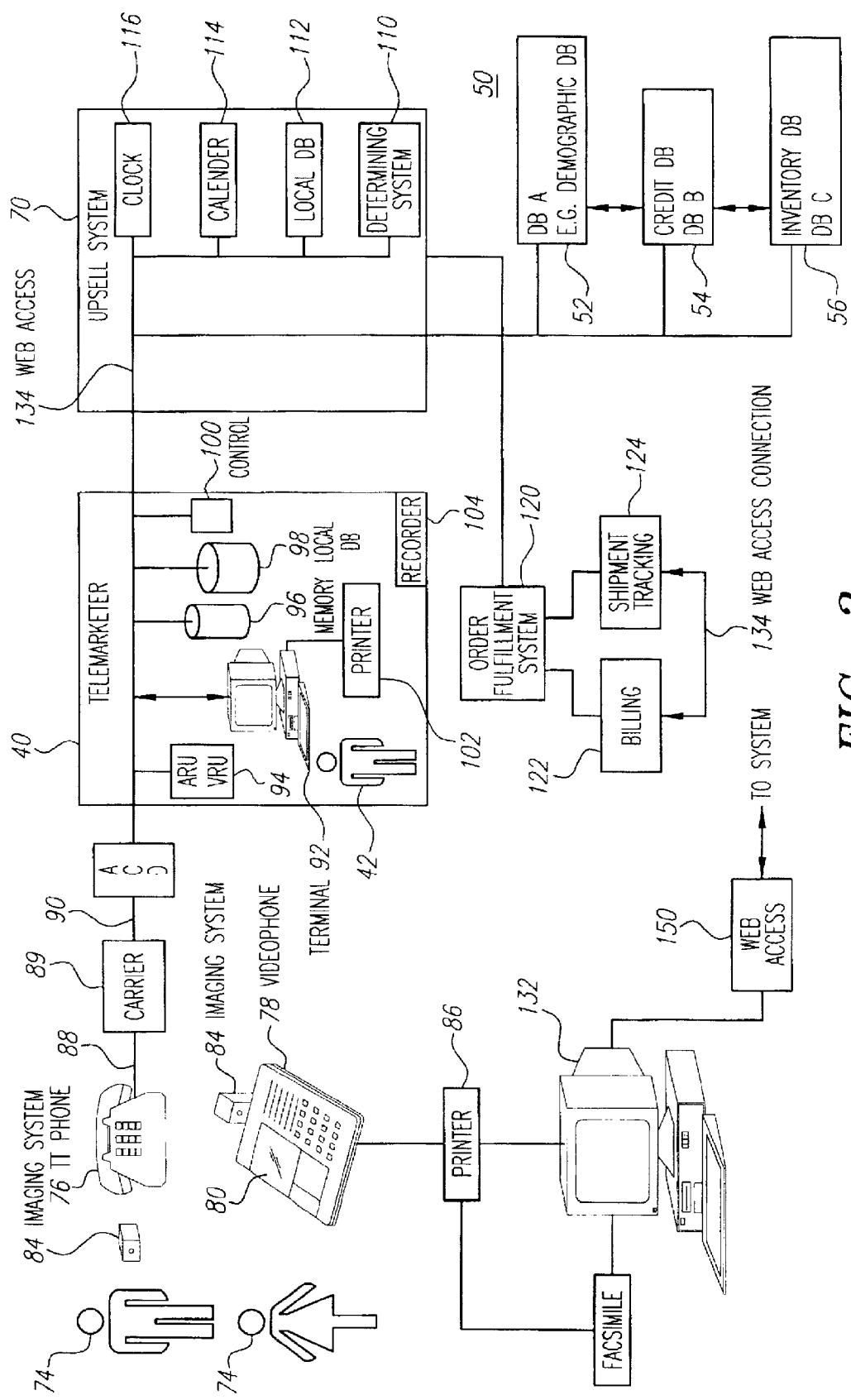
FIG. 3 is a flowchart for an Internet-based order transaction in accordance with the invention.

FIG. 2 is a block diagram of a simplified embodiment of structure usable to achieve the functionality of these inventions when suitably adapted for such use. FIG. 3 is a more detailed schematic diagram of one possible implementation of a structure for use in implementing the functionalities of the inventions here. When feasible, the same numbering will be used in various figures to describe any corresponding element.

FIG. 2 shows a block diagram of a telemarketing system 40 adapted for communication with one or more databases 50, as well as a database 42 which may be integral or resident within the telemarketing system 40. Within the telemarketing system 40 are grouped various functionalities, including the telemarketing company operator 42, the database 44 resident at the telemarketing system 40 with its attendant computer for processing and control, as well as a computer 46 for analysis of the inputs and generation of one or more outputs for provision to the user. One or more external databases 50 may be included within the system. A first database A 52 and a second database B 54 are depicted, though it is to be understood that the selection of two databases 50, and the interconnection therebetween, is selected for expository convenience and is not intended to reflect any limitation on the structure or functionality of the system, provided the functionalities of the invention may be achieved.

FIG. 3 shows a block diagram of one implementation of a telemarketing system at a greater level of detail as compared to FIG. 2. While the following description is generally provided in the context of inbound telemarketing, the inventions herein may also equally be applied to outbound telemarketing. Users 74 (also known as customers, or potential customers) access the telemarketing system 40 via any known manner of telephone, telephonic instrument or its equivalent. As shown, telephone 76 comprises a touch-tone phone having a handpiece including a speaker and receiver, as well as an array of alphanumeric buttons for actuation by the customer 74. Alternatively, video phone 78 provides for both audio communication as well as image or video communication. The video phone 78 includes an array of alphanumeric buttons, a video display 80, typically a handset, and some imaging system 82, comprising a camera or other image generating system. A conventional touch-tone phone 76 may be utilized in association with a separate imaging system 84, if desired. In yet other modes, the customer or user 74 may interact with any other form of man-machine interface which is consistent with the goals and functionalities of these inventions. By way of example, but not of limitation, the customer 74 may interact with a computer, whether stand alone or networked (by local area network (LAN), wide area network (WAN) or otherwise), which includes a communication capability (modem, etc.), or may comprise access capabilities to the Internet or web or internet television type systems. While the particular implementations and embodiments of the user 74 interface may vary, any interface which provides output to the customer 74 and permits return entry consistent with the functionalities to be achieved herein is acceptable. Optionally, other devices such as a printer 89 may be included. These various devices then interface with a carrier 89. The interconnection 88 between the end instruments 76, 78 may be of any mode or manner, such as a copper wire connection, cable connection, wireless connection, cellular connection, satellite connection, or any other mode or manner of connection. Similarly, the communication path 88, and carrier 89 may utilize any type or mixture of carrier technologies, whether analog, digital, ISDN, or at any rate of speed consistent with the achievement of the functionalities described herein. Preferably, the carrier 89 includes the ability for provision of more advanced telephony services, including the provision of DNIS, the dialed number identification service, and some form of caller identification such as automatic number identification (ANI, caller ID, etc.). Typically, the DNIS and ANI information are provided from the carrier 89 to the telemarketer 40 over connection 90, and may be either in-band or out of band signaling, such as bead-channel signaling in current time division multiplexed modes of operation.

Other illustrative aspects of a user interface can include an Internet home page for a search engine that is adapted to conduct keyword or other types of searches in response to requests submitted by users. Known search engines typically return the same set of results to different given users, if those users present the same or similar keywords for search. Thus, two different users A and B who submit the keywords "GOLF" and "CLUBS" at the same general time would typically receive the same general results in the same general order of presentation. These conventional search results might be characterized as "static" search results. However, using the teachings presented herein, such known search engines can be adapted to present different search results to different users, with the search results being ranked, ordered, selected, or presented according to analysis of the various user-specific data, factors, and/or parameters disclosed herein. Illustrative and non-limiting examples of such factors can include tastes, interests, or quality expectation parameters of a given user, the location of the user when conducting a search or other primary transaction, or the time at which such search or transaction occurs. In this sense, the search results as taught and described herein may be characterized as selected "dynamically" or "intelligently" for a particular user or group of similarly situated users. For example, a first user may submit a keyword search for "GOLF" and "CLUBS" and receive a first set of results chosen particularly for that first user, while a second user presenting the same keyword search might receive another set of results chosen particularly for that second user. Continuing this example, the first user may be known, for example by applying the teachings herein, to favor a given retailer. Thus, if that retailer appears prominently in the search results, the first user may be more likely to consummate the purchase by hitting the retailer's website, or by contacting the retailer via phone or other means. On the other hand, based on the teachings herein, the second user may be known to favor a second different retailer, or may be known to be a wholesale purchaser rather than a retail purchaser, with the search results being tailored in light of this knowledge. Further, if the different users are known to favor different brands of goods/services, then these preferences can also influence the order and/or the contents of the search results. These examples are provided for illustration only, and do not limit the applications of the instant invention.

Those skilled in the art will recognize that various financial and/or contractual arrangements to facilitate the above intelligent and dynamic selection process are possible between the search engines and the various entities (e.g., online or brick-and-mortar merchants) who may be represented in search results generated by such search engines. More particularly, fees or rates charged to these entities may be adjusted in light of the participation of these entities in the intelligent and dynamic selection process taught herein, as compared to conventional arrangements between such entities and search engines that generate "static" search results. Increased sales possible under intelligent and dynamic selection process as taught herein may justify these participating entities paying a higher fee.

FIG. 3 depicts the telemarketing system 40, and separately identifies the upsell system components 70. The upsell system components 70 may be optionally included broadly within the telemarketing system 40, or may be provided on a stand alone basis, such as where the upsell system 70 is geographically distinct from the telemarketing system 40, and indeed where the upsell system 70 may be resident at a third party location and be utilized by one or more telemarketing systems 40.

The telemarketing system 40 interacts with the carrier 89 via communication path 90. Optionally, this path may include various additional structures and functionalities as known to those skilled in the art. For example, automatic call distributors may be utilized at the front end of the telemarketing system 40 so as to serve a routing, holding and/or load leveling function, either done or in combination with other hardware and/or software. Within the telemarketing system 40, one or more operators 42, typically bearing headsets for audio communication, interface with terminals 92 which provide for at least textual display, and optionally, graphic image or video display. The operator 42 interfaces with the terminal 92 through any mode or mechanism, such as a keyboard, mouse or other pointing device, or any other man-machine interface for data entry or communication. Conventionally, the operator 42 is a live operator, though optionally the generation of audio images or video for presentation to the customer 74 may be synthesized or simulated or represent virtual reality. By way of example, a text-to-speech unit or other form of recorded speech may be utilized. An audio response unit 94, also termed an interactive voice response unit, may be utilized to provide some or all of the customer 74 interaction. Additional structures and functionalities required for the operation of the telemarketing system 40 may include local memory 96, local database 98, control (processor unit) 100 to provide overall coordination and control of the various components of the telemarketing system 40 and its interaction with the other units described. Additionally, a printer 102 may be provided for generating a hard copy record, such as of order transactions. Additionally, a recording unit 104, whether for audio, images, or both, may be included.

The upsell system 70 typically includes a determining or type analysis system or unit 110 which serves to receive the various inputs for the determining unit and to generate outputs relating to possible upsells for the customer 74. Optionally, a local database 112 is provided within the upsell system 70. Chronological information, such as provided from a calendar 114 and/or clock 116 may be utilized within the system. The databases 50, whether resident or external, are shown as database A 52, in this depiction being a demographics database, database B 54 being a credit database and database C being an inventory database.

Optionally, the system may include an order fulfillment system or unit 120 which is coupled to receive outputs from the telemarketing system 40 and/or the upsell system 70 indicative of a consummated transaction requiring fulfillment. Optionally, a billing unit 122 and shipping/tracking unit 124 may be utilized in conjunction with the order fulfillment system 120.

A simplified interconnection is provided in FIG. 2 and FIG. 3. The selection and arrangement of the interconnection, as well as its implementation, are matters which are known to those skilled in the art and depends upon the particular technology in which the system is implemented. Any interconnection or mode of implementation may be utilized which is consistent with the achieving of the goals and functionalities of these inventions. Yet other modes of accessing the system may be utilized. For example, electronic or web access 130 generically depicts access through communication networks, such as through Internet access, cable, television, direct broadcast, satellite broadcast, e-mail, facsimile, voicemail or otherwise. The web access 130 may connect via web access connection 134 to some or all of the various portions of the system, such as the shipping/tracking unit 124 so as to check on shipping or delivery information, the billing unit 122, or to directly access the upsell system 70 as a variation on the point of entry into the overall system. When considering access in a non-telephonic, though still electronic manner, reference should also be made to the descriptions of FIGS. 4 and 5 relating to Internet or web-based access and systems. Returning to the search engine example discussed above, the term "primary transactions" as used herein can encompass requests by users for keyword searches, using, for example, an Internet web page hosting or supporting a search engine. Further, in other aspects of the invention, the term "primary transaction" can also encompass subsequent transactions conducted by the user with one or more merchants listed in the search results. In light of this teaching, a search engine website may serve as a non-limiting example of an Internet- or web-based system as taught herein.

The depictions in FIG. 2 and FIG. 3 will be used now for a brief description of one mode of interaction of the customer 74 with the telemarketing system. A customer 74 may utilize a video phone 78 to dial a toll-free telephone number in response to observing a promotion for a good or service. The carrier 89 effects telephonic connection to the telemarketing system 40 preferably providing DNIS information which is utilized by the control unit 100 and local database 98 to provide a textual display on terminal 92 for use by the live operator 42 in interacting with the customer 74. Additionally, the carrier 89 may provide caller identification data, such as ANI data, which may be utilized by the control unit 100 to retrieve information from the database 98 particular to the customer 74. In addition to database 98, geographic designator programs exist which may be utilized to receive ANI data and to identify the geographic location of a customer such as by zip code, or more particularly, by zip code plus four. Based upon the retrieved information as provided to the live operator 42, a dialog is conducted relating to the primary transaction for which the customer 74 made the primary or initial contact with the system. While handling the primary transaction, the system may access one or more databases 50, such as a credit database 54 and a inventory database 56. If the user's credit card number has been obtained, such as during the primary transaction, or is otherwise known to the telemarketer through prior contacts or is devined via a correlation system, the credit card number may be utilized to obtain raw or analyzed data regarding the caller. The response from the credit card issuer or processor may be specific, such as providing data on the user's income, sex, history of purchase transactions or any other personal or demographic information known to it, or may provide a analyzed, coded message in response. The credit information, personal information, demographic information, possession information or other form of input data is then used by the system to generate the upsells or other real time provision of a secondary transaction. The secondary transaction may relate to the offer of a good or a service, or to a coupon, ticket, card or other promotional material having a variable or designated value for the purchase, lease or other acquisition in the future of a good or a service. In the preferred embodiment, there is a real time offer during a real time transaction. If the transaction is consummated, an indication may be provided to an order fulfillment unit 120 and attendant units such as the billing unit 122 and shipping/tracking unit 124.

Within the contemplation of the inventions, while a customer 74 is interacting with the operator 42 with respect to the primary transaction, the upsell system 70 is obtaining various input information for generation of a potential upsell item. As shown in FIG. 2, data regarding the instant call 60 may pass from the telemarketing system 40 to various databases 50, such as directly through path 62, or alternatively, from database A 52 to database B 54 via path 70. Database A 52 may provide in return analyzed or raw data 66, and similarly database B 54 may provide analyzed or raw data 64 to the analysis system 70 for processing in accordance with the inventions herein. Upon generating the potential upsells, that information is provided to the telemarketing system 40, for presentation to the operator 42 on the terminal 92. As described in more detail in connection with FIG. 8, multiple options may be presented for selection by the operator 42. If a transaction is then consummated with respect to the upsell, the order fulfillment unit 120 and associated units may be utilized as in connection with the primary transaction. As described further below, the data from the proffer of the upsell may then be utilized in subsequent transactions, such as by storing the information in memory 96, or by utilizing it in connection with the determining unit 110.

Reference has been made to the provision of analyzed or raw data 66 in connection with databases 52, 54. The following discussion applies generally with respect to the form of data provided. A database access may provide raw data, such as specific data relating to a given user, e.g., a particular user's income. A system may also provide analyzed or processed data, such as where not all of the data provided is raw data, but includes processed data, e.g., a coded designation indicative of certain aspects of the user. By way of example, third party database possessors often maintain substantial raw data specific to their customers. Financial institutions and transaction processors, such as banks, brokerages, credit card issuers, credit card processors, have extensive databases either from data provided to them such as through application, forms or which is known to them due to their continued course of contact. For example, a credit card company may both know specific raw data relating to a customer through the customer's indication of its income on the original application, but may also possess data relating to purchases (such as transaction frequency, amount, type, item and location) which are obtained in the course of processing the transactions of the user. The third party database owner may be unwilling or unable, e.g., due to legal restrictions, from providing the raw data to other parties for their use in telemarketing or electronic commerce applications. However, process data which does not specifically reveal information of the user may be provided. For example, a coded designator may be provided from the third party database to the transaction or upsell processor, typically through agreed upon codes and formats, whereby the required information is provided, but in a generic enough manner so as not to raise privacy or other concerns. For example, a designator code XYZ may relate to a user with an income over $50,000, expected net worth of $75,000, is a homeowner, and has an interest in stereo equipment. In this way, the specific confidential information of the user may be preserved, while providing effective input for the processing or upsell system. One or more coded designators may be provided. Coded designators may be provided at a finer level of granularity, such as one designator to indicate whether or not the user is a homeowner, has an income within a defined range, etc. In this way, multiple designation may provide a more complete description.

Figure 4:
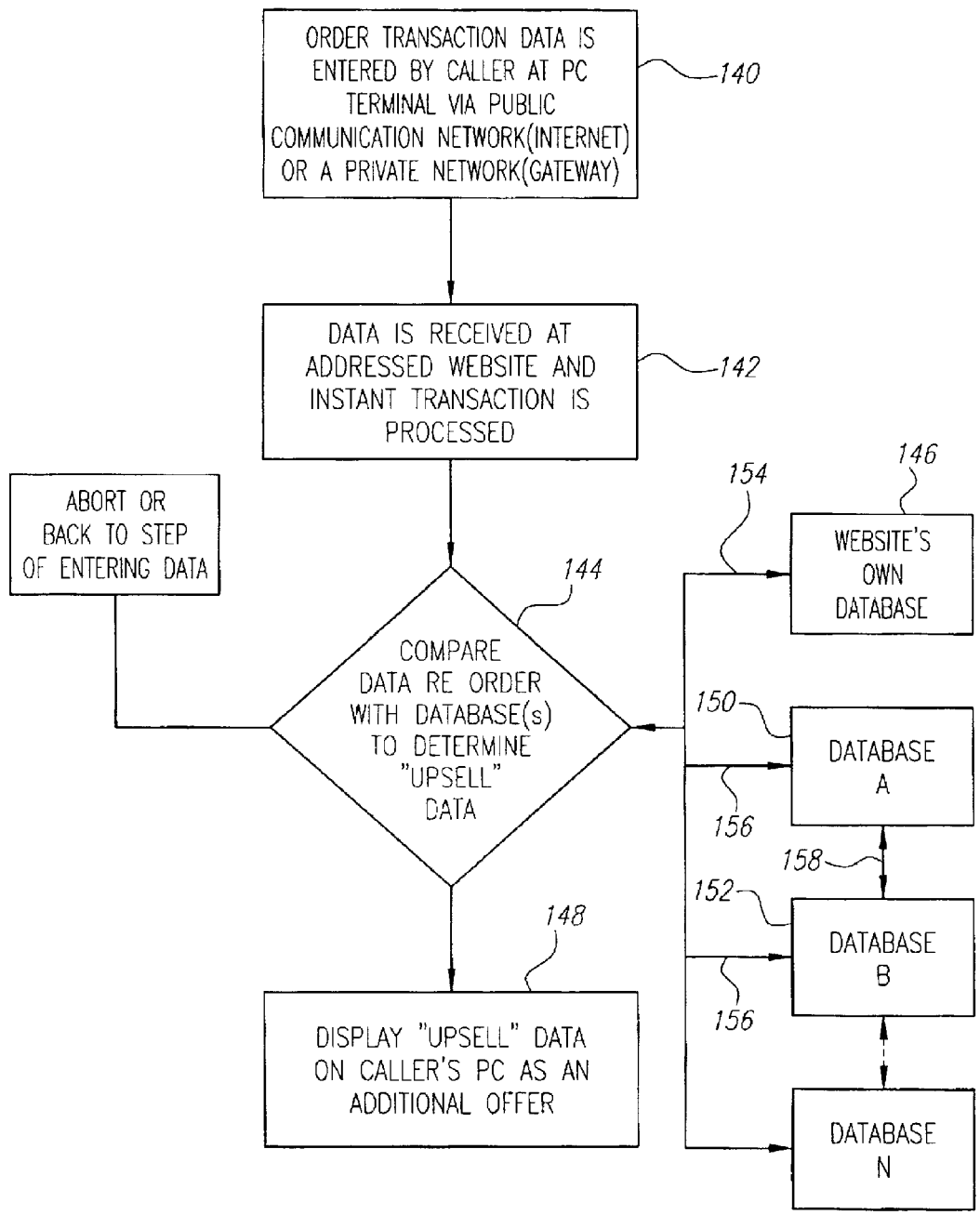
FIG. 4 is a block diagram of a system adapted for telemarketing applications.
Figure 5:
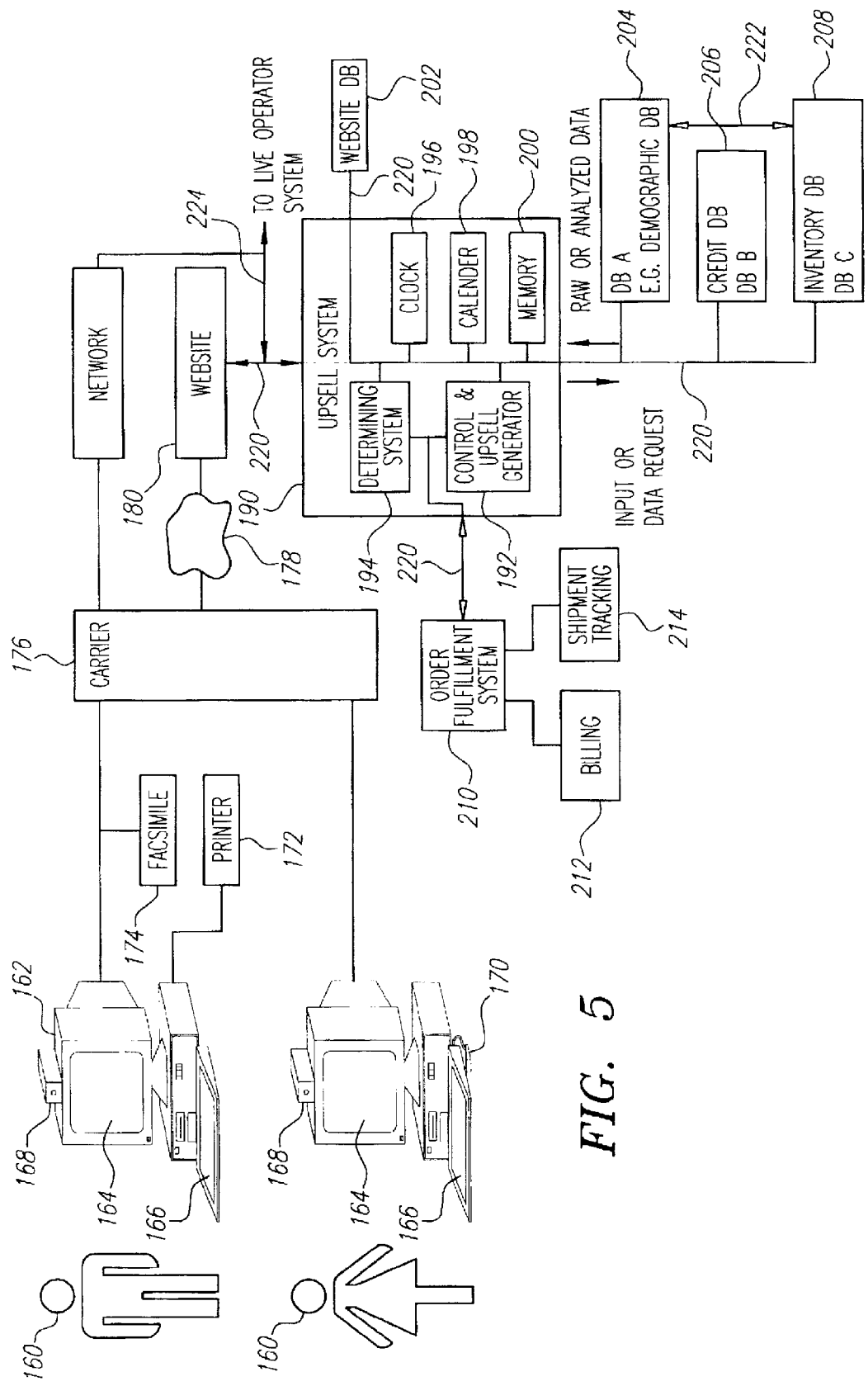
FIG. 5 is a block diagram of a system adapted for Internet or other electronic commerce use.

FIG. 4 shows a simplified flowchart and block diagram depicting an Internet, web-based or other electronic commerce system for performance of the inventions herein. FIG. 5 shows a detailed block diagram of one optional implementation of such a system. To the extent that description provided with respect to other figures described the same or similar structure or functionality, the description is incorporated herein by reference.

As shown in FIG. 4, a user interacts with the system via contact block 140 such as by having a primary transaction comprising an Internet order transaction being entered or effectuated by a user at a personal computer (PC) terminal. During the course of the primary transaction, processing step 142 serves to receive data at an addressed website and process the primary transaction. That transaction may be optionally consummated or not as suits the overall purpose of the transaction. By way of example, if the upsell serves to obviate the purpose for the primary transaction, such as when the primary transaction is for customer service or repair, and the upsell is successful in providing the customer with a new product in replacement thereof, then the primary transaction need not be consummated in the manner contemplated by the user at the point of initial contact 140.

Continuing the illustrative search engine embodiment discussed above, the user may locate the addressed website using a search engine to perform a keyword search related to goods, services, or other subject matter sought by or of interest to the user. In some aspects of this illustrative search engine embodiment, the primary transaction could include, at least in part, the process of locating a given merchant (or the merchant's website) using an Internet search engine website. Thus, a user interested in purchasing a set of golf clubs might submit a keyword search for the terms GOLF CLUBS to any one of a number of Internet search engines to locate a merchant dealing in golf clubs. Further, the primary transaction may include, at least in part, the initial query as submitted to the search engine. In this example, the information selected intelligently and presented to the user could include the search results themselves, as discussed above, or advertisements or other information presented in connection with the search results.

In further aspects of the invention, a given user may be classified or characterized as a "buyer" or a "shopper/researcher". Results or information directed to the former might feature merchant sites more prominently, while results directed to the latter might feature sites more focused on information, user reviews, specifications, discussion forums, professional commentary, or the like, as such may pertain to the subject matter of interest to the user.

Continuing with the flow of the program, at analysis block 140, the various inputs for use by the analysis system are collected, and subsequently analyzed. In the course of this collection and analysis, various sites, such as the websites own database, 144, remote database A 150 and/or remote database B 152 may be accessed. The coupling 154 between the analysis system 144 and the website database 146, as well as the couplings 156 to the external or other databases, 152, as well as any coupling 158 between the databases 146 (coupling to other databases not shown), 150, 152, may be implemented as known by those skilled in the art. The particular selection of interconnections between various components is left to selection of implementation, where the implementation merely needs to be consistent with the goals, objects and functionalities of this invention. Upon completion of the analysis at analysis block 144, the output of the analysis block 144 is provided to the user through action block 148. The upsell data may then be displayed on the caller's PC as an additional offer, or in lieu of the primary transaction.

FIG. 5 depicts one or more users 160 (also referred to as customers or potential customers) who interface with the system via a computer 162. Typically, the computer 162 includes a display 164, such as a CRT or flat panel display, some input device such as a keyboard 166, and optionally a mouse 170 or other pointing device, and may optionally include an imaging unit 168 to image the user 160. Additional devices such as a printer 172, such as to provide a permanent transaction record or to print images regarding proffered goods or services may be included. Similarly, a facsimile machine 174 may be included, and may be connected to a telephone system for effective communication. Again, any type of human/machine interface consistent with achieving the goals and functionalities of the instant inventions may be utilized with this system. A carrier 176, such as an on-line access service, cable access service, network, or other wired or wireless connection may be used to access the desired website 180. As depicted, connection path 178 is provided which serves as a generalized descriptor for a path, such as a Internet established routing, network routing, or other routing for connection of the user 160 for the website 180. The term website 180 is not intended to be a term of limitation, but rather of generic description, to be an intermediate or terminal node or contact point in the effecting of the electronic provision of goods or services so as to result in commerce or information transfer. While the website 180 may be a site on the Worldwide Web (WWW), it need not be so. The underlying aspects of this invention more broadly encompass the functionalities and structures to achieve them, as those particular implementations to achieve them are modified over time. Further non-limiting examples of the website 180 can include a search engine website, as discussed above and elsewhere herein. The user can employ such a search engine website to locate online retailers, or to locate local "brick-and-mortar" merchants dealing with a desired good and/or service. Further, the website 180, or a search engine associated with one or more such websites 180 may be adapted to initiate or propose diverting some users, preferably but not necessarily those identified as "buyers", "serious buyers", or "well-qualified buyers", as opposed to "browsers" or "lookers", to live agents. The selective diversion of selected users to live agents or operators is to be distinguished from merely offering the opportunity to chat with a live agent to all users, regardless of their individual characteristics or qualifications.

The upsell system 190 includes a control and upsell generator system 192, such as implemented through a special purpose computer or a general purpose computer program or otherwise adapted to achieve the functionalities described herein. The program may be implemented in a linear programmed fashion, or may use other decisional bases, such as expert systems, fuzzy logic, neural networks, adaptive systems, or other decisional systems known to the art, and which effectuate the desired functionalities of the inventions. Further, a determining unit 194 maybe included to provide an indication of the purpose of the original contact in the primary transaction. Clock 196 and calendar 198 provide date or chronology information, and may be combined as a single unit. Memory 200 may serve to store program information, input information to the control and upsell generator 192 or other data required for effective operation of the system. The website 180 may include its own database 202, either directly connected to the website 180 or to the upsell system 190.

Various databases, including database A 204, e.g., a demographics database, database B 206, e.g., a credit database, and database C 208, e.g., an inventory database, may be accessed. Optionally, an order fulfillment unit 210, and associated billing units 212 and shipping/tracking unit 214 may be included as described in more detail with the telemarketing system. The interconnects 220 between the website 180 and the upsell system 190, and between the upsell system and various databases 202, 204, 206, 208, as well as the coupling from the upsell system 190 to the order fulfillment unit 210. Optionally, a connection 224 to a live operator system, such as the telemarketing system previously described, may be utilized. In this way, while an initial access for a primary transaction is provided to a website, through program flow (where the operator may initiate contact with the user) or at the election of the user (where the user may initiate contact with an operator) 160 may be placed in connection with an operator. Such an option provides for the ability to provide individualized interaction between the user 160 and the overall system for the provision of electronic commerce or information transfer. Continuing the search engine example discussed elsewhere herein, further non-limiting examples of "information transfers" as taught herein can include search results that are selected dynamically and intelligently for particular, respective users (or groups of similarly-situated users) who may access Internet search engine websites to conduct queries. Still further non-limiting examples of these "information transfers" can include advertisements or other materials that are selected dynamically and intelligently and presented to the user in connection with such search results.

Figure 6:
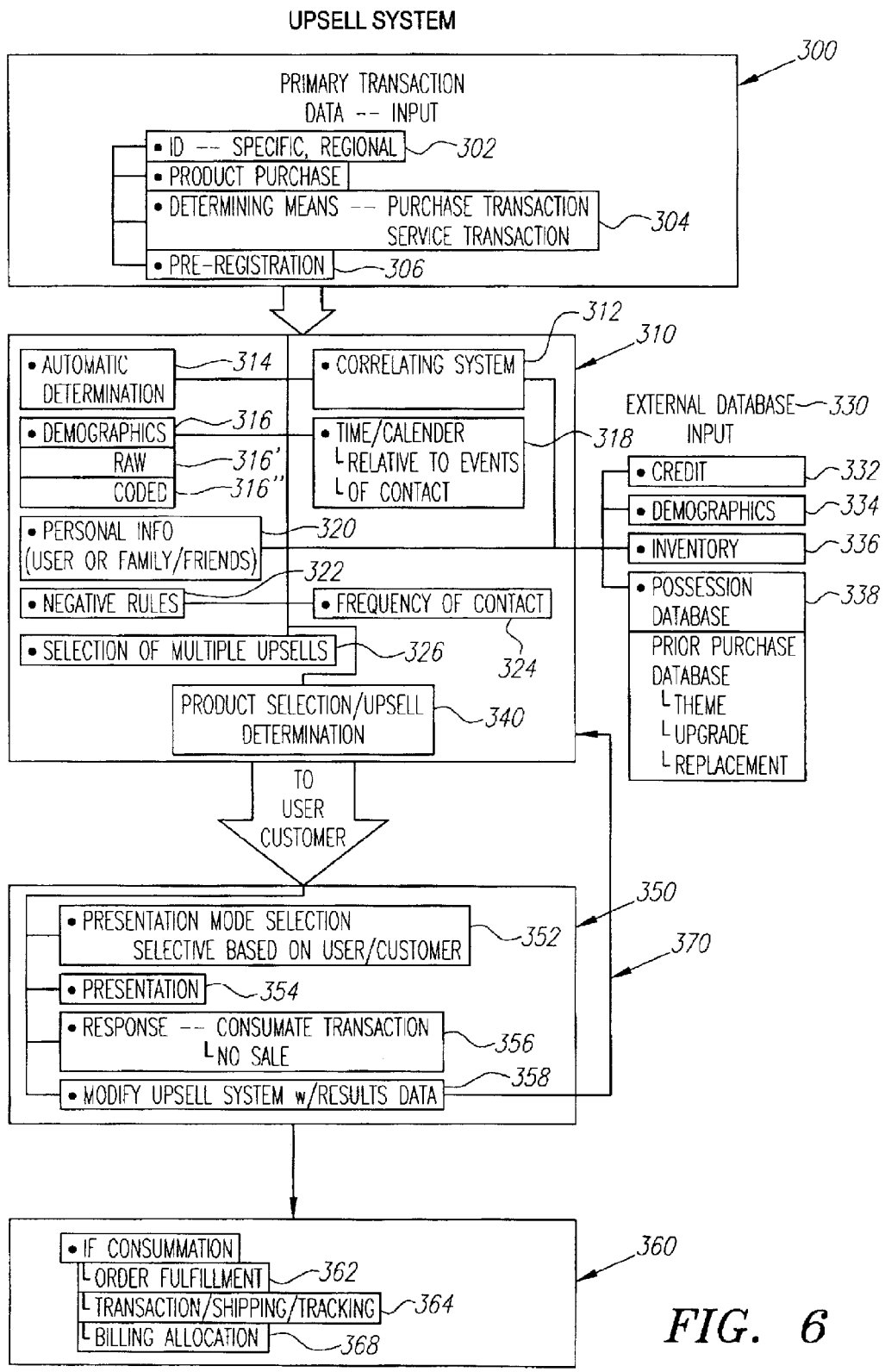
FIG. 6 is a block diagram of the functional aspects of the system.

The various steps in the typical operation of the overall system will now be described, with contemplation that the description may apply to telemarketing-based systems as well as electronic commerce-based systems, the applicability of the particulars to be taken from context. The description will relate to FIG. 6 which shows various interconnected functionalities, and will relate to other figures when noted. Broadly, the following discussion will relate to the primary transaction, both as to the data and completion or consummation of the primary transaction, second, to the upsell determination or other identification of specific proffers to the user, and finally the conveyance of that information to the user and the action or consummation taken after that provision of information to the user.

As to the primary transaction data 300, in a first aspect the primary transaction data may include a type of contact component 304. The type of contact may designate a purpose, particularly a primary purpose, for the original contact by the user. By way of example, a type of contact may be a purchase contact, or alternatively, may be a service contact. A system such as the determining unit 194 (FIG. 5) may generate the indication of the type of contact. The type of contact may be determined from the address information utilized by the user, such as where different telephone numbers are provided for sales as opposed to services, in which case the dialed number or DNIS information directly provides indication of type of contact. Alternatively, the selection may be designated by the customer, such as where a menu selection is provided, e.g., press 1 for sales, press 2 for service. The type of contact may also be in determinant, such as when the user has contacted a site without a specific purpose in mind. The type of contact may be defined at various levels of specificity, such as an indication that the type of contact was for purchasing generally, though without intent as to purchase of a specific item, to the presumption that the type of contact was specifically for purpose of a particular product.

A second aspect of the primary transaction data may include customer identification 302. Customer identification may be specific to a customer. Examples of specific customer identification would include a user's social security number, customer number, personal identification (PIN) number or other designator uniquely identifying the user. In the electronic realm, the customer identification may comprise an e-mail address, e.g., jasmith@aol.com, and Internet provider identification, or a source designator on a network. Various forms of electronic signatures may be provided which serve an identification, verification and authentication function. Small text files known as "cookies" may also identify a given user or a given computer system, for example, to a search engine website, in connection with or apart from the various identification means discussed herein. In the search engine context, these cookies could enable the search engine to identify the given user, with this identification serving as at least one input to determine what the user has searched for or purchased in the past, determine what goods, services, information, merchants, or brands may be of particular interest to the user, and otherwise serve as direct or indirect input to the upsell/information selection process. Further illustrative identification means might include user logins, membership enrollments, profiles created for specific users when they register or enroll for services, or the like. More generally, any mechanism by which a given user or given computer system visiting a given website (such as a search engine) can be identified may be used in these embodiments of the invention.

At a lesser level of specificity, namely, one at which a specific user may not be identified, various forms of identification exists. For example, a telephone number may provide geographic indication, such as through knowledge of its area code, or provide even more geographic specificity through the prefix. Other geographic descriptors, such as zip code or the finest level of geographic granularity (zip code plus 4) may be utilized. A residential customer number may not yet specify a particular customer within a household or location. Other forms of address, such as fax number, may be utilized to provide a local identification.

The user may be identified in yet other terms. For example, the user may be identified based upon the specific items being purchased, or more broadly, the type of item being purchased.

Further, the user may be identified by a quality factor, that is, some indication as to the perceived quality of the goods the purchaser may be interested in, such as based upon the initial contact. If the potential customer has contacted the system with respect to a high-end product, the system may classify the caller as one interested in high-end goods. Further, the timing of contact may be utilized to classify a caller. For example, a "night owl" who contacts the system after midnight to purchase computer products may be identified differently from a user who contacts the system at 6:30 in the morning.

As yet another aspect of identification, multiple individual items of identification may be combined or otherwise utilized in combination to provide yet further identification, confirmation or verification of identity.

While user identity may be obtained from the particular contact with the system, that identity, or further identifying data, may be entered during a preliminary or registration phase 306. In such a phase, additional information may be acquired. The data may be acquired in response to specific questions, or through an iterative or interactive approach.

Optionally, the forms of identification may be used in combination to provide higher level of specificity, such as to move from a local identification to a specific customer identification. One mode is to utilize further specific identification, such as initials, or to otherwise designate an identity. Alternatively, or in combination, once the suspected specific customer identification is arrived at, this may be confirmed with the user, e.g., by confirming "Is this John Smith?". Verification may be utilized, such as through provision of personal data, or through provision of an electronic signature or other secure and verifiable means of identification.

The identification may be obtained either automatically or in an non-automatic fashion. Automatic collection of identification may include the receipt of ANI information or electronic identification for electronic commerce or information provision. Non-automatic methods may include data entry, typically in response to prompts, such as through use of an interactive voice response unit.

The final aspect of the primary transaction is the completion or consummation of the primary transaction. In one implementation, the primary transaction may be completed, such as through consummation of a sale or completion of a service call or request. In yet other aspects, the primary transaction may be concluded, though not with the provision of the originally contemplated good or service. For example, in the context of a service contact, if the upsell is successful in providing the user with a replacement product, the primary transaction need not be completed. Optionally, at the caller's discretion, the primary transaction could be completed, such as where a caller does purchase a replacement product, but yet still wishes to obtain service on the product which form the basis for the original contact, and for the upsell.

After the primary transaction phase 300, the item selection phase 310 is entered. Within the overall contemplation of the system, it may be desirable to include a correlation unit 312 for matching one or more initial contact designators with yet another designator adapted for use in subsequent processing, such as database access. For example, when a caller's telephone number is obtained, and a specific identification arrived at, the correlation unit may provide the user's social security number for further access to databases in which that number provides a key or address. By way of example, third party databases may require specific forms of identification for accessing the databases, such as a combination of social security number and PIN number and that information may be provided from the correlation unit based upon the identification data obtained from the user. In this way, different outputs may be utilized for accessing third party databases, keyed to those databases, without requiring the user to excessively input identification information. Once the correlation unit has obtained unique, individual identification, it may provide the other forms of identification to yet further databases or other components in the system.

The identification of an upsell product or offer is divided into the aspects of identification and obtaining of inputs 300, the upsell determination 310, the output for subsequent offer 350 and, if applicable, order handling 360. As to the inputs for the upsell determination, they include the identification data 302, described previously. Further, demographic data 316 may be utilized relating to the user. The demographic data may be obtained from a database and be either raw data 316' or analyzed data 316". Data relating specifically to the customer 320 may include age, sex, income (either actual or estimated), profession or occupation, education level, family status, e.g., married, divorced, widowed, children, grandchildren, and specific data relating to them, lifestyle indicators, e.g., active outdoor, etc., address (specific address, city of residence, county of residence, state of residence, zip code, zip code plus 4), known interests, known subscriptions, known affiliations (e.g., service organization, alumni association, fraternal organizations, charitable organizations, etc.).

In addition to specific information on users, the user may be associated with a code or designator which indicates others of a expected or suspected similar set of interests or reactions to an upsell. For example, the system may identify by code "422" those who are males in the 35-40 year old age bracket, with incomes in excess of $40,000 per year, with an interest in computers. That code may then be used as an input to the upsell selection system.

Credit data 332 may be checked in the course of the primary transaction, as well as in the course of generating inputs or processing for the upsell determination. In one aspect, the credit verification may take place in conjunction with a credit verification for the primary transaction. If the primary transaction is a purchase transaction, the credit verification may be obtained for the primary transaction, and then either obtain a specific credit authorization for an amount equal to the expected upsell, or obtain an indication of the amount of available credit remaining. If the amount of available credit remaining is provided, that will provide an indication of the preferably upper bound on the cost of the upsell offer.

Yet another form of database information includes inventory data 336. In determining the items for upsell, the inventory database may be consulted before, during, or after the upsell determination. The upsell may discount the offering of a product which is unavailable at that time. In another aspect, the system may yet still offer the product if it will become available in a timely manner. As yet a further aspect of inventory status, a delivery time window may be included, such that if the product cannot be obtained from inventory and delivered to the customer in a timely manner, that product is not offered as an upsell.

Third party possession 338 databases may be utilized. A manufacturer may maintain a database which maintains what it believes to be an accurate count of items possessed by the user, or an intended recipient of the sale or upsell. For example, a seller of china or formal dining services may maintain a database of the number of place settings of a particular pattern owned by a potential recipient of yet further settings or related goods. In this way, an input to the upsell determination unit may include the offer of specific items of merchandise which complete or compliment existing possessions.

Turning now to the upsell determination 340 or the selection of the product or service for offer, generally, the system comprises a multiple input, dynamic, preferably real-time system for the selection of a suggested product or service to offer to a potential customer or user. The process includes the identification or selection of a set or subset of all possible goods or services available for offer, with the goal of optimizing the likelihood of upsell, as well as achieving customer satisfaction.

In one aspect, the upsell determination system may utilize, in whole or in part, a system which bases the offer of an upsell based upon prior successful upsells. Thus, if a customer is categorized as being in class 422 who called a telemarketer to buy product X, and was successfully upsold product Y, if a later customer in class 422 contacts the system, the past success may be utilized as a factor in again offering the product Y to the caller.

Various historical factors relating to a specific customer, or to known classes of customers may be utilized. The selection criteria may include negative decision criteria, such as not trying to upsell a customer on an item that the system knows he has previously purchased, or has previously been offered but declined to purchase. The system may utilize prior purchases as a factor in determining the upsell for offer. Prior purchases may indicate areas of interest, suggesting the offer of further goods within that general area of interest. For example, a customer who has previously purchased clothing for use in mountain biking may be more susceptible to an offer for mountain bike related goods or services. In a similar vein, theme sales may be utilized. When it is known that the customer has previously purchased a portion of a set, the completion of the set may be a goal. Certain theme sales are based on periodic introduction of a new item, such as a yearly addition of a tree ornament or the like.

Other factors affecting the upsell may include inputs comprising areas of interest, such as based upon known subscriptions, prior contact of the user to other sites, such as other Internet sites may be utilized by the system to determine a user's possible interests, and therefore, their susceptibility to the upsell of particular goods or services. These factors can further include, but are not limited to, data related to visits to one or more Internet search engine sites by the user in connection with locating information relating to items of interest to the user, or locating merchants dealing with such items. Any data related to previous keyword or other searches conducted by respective users may be input into the upsell, including for example, the keywords themselves, the results of searches for given keywords, sites within the results that are actually visited by the user, the amount of time spent by the user at these various sites, web pages devoted to particular goods/services or to particular brands of goods/services, or the like. Further, any of these types of website-related identifiers or data elements can be combined or analyzed in connection with the other examples of data elements described elsewhere herein. If data representing the user's physical location is available to the upsell (e.g., user keys in ZIP code, upsell system refers to cookies or to secondary source such as previous orders placed by the user, etc.), then the upsell system as implemented in this search engine context can factor-in this location when formulating ranking, or ordering the search results provided to a given user, for example, those merchants closest to the user may be placed prominently in the search results provided to the given user. This feature enables the user to minimize shipping costs, and can also enable the user to visit a merchant's store for a demo or to purchase the item, thereby eliminating shipping costs altogether.

Yet another aspect of basing the upsell selection on prior purchases may include upgrades to prior purchases. For example, where the system determines that the user has previously purchased a computer of a given make and model, the system may offer as an upsell a good or service particularly adapted to improve the performance of the system of the user, such as provision of additional memory, or other modified component. Similarly, if a user is known to have a given version of software, the system may elect to offer a new version of the software. Obsolescence of prior purchases may be determined. This may be from the passage of time, updating of a product, or outgrowing of a prior purchase.

Yet other facts affecting an upsell may include relative considerations. For example, relative proximity to key calendared dates 318 for the user, or others associated with the user, may be incorporated. The relationship of traditional gift giving days to the date of contact may be utilized. Examples would include proximity to known birth dates, Christmas, Hanukkah, anniversaries, Valentines Day, etc. Further, family or relationship status may be utilized, such as offers of products for purchase for children, grandchildren, or others with whom there is a known established relationship.

The frequency of the upsell may be varied based upon expected receptiveness to the upsell at that time. Certain users may, through past particular experience with that user or through assumed desirability based upon studies of others, may determine the frequency with which upsells should be offered, whether to offer an upsell every time there is a contact, every other time, only in association with certain days or date (such as pay days), etc. The frequency may also be decreased if the user has manifested a lack of receptiveness to the offers in the past, or to a certain type or class of offer.

Multiple upsell items 326 may be utilized. In the telemarketing context, the telemarketer may have displayed to them multiple options, either for selection by the telemarketer, or for sequential presentation to the caller. In the electronic commerce context, multiple offers may be made such as on a screen, or provided sequentially to the caller. In this electronic commerce context, and continuing with the search engine example discussed elsewhere herein, a user can conduct a primary transaction in the form of a keyword search submitted to a search engine website. This user may, in turn, receive upsell items in the form of intelligently and dynamically selected search results, accompanied by one or more intelligently and dynamically selected advertisements related to the user and/or the subject matter for which the user searched. These intelligently and dynamically selected advertisements can take any form known to those skilled in the art, such as "hot spots", hyperlinks, or "hot links" within an existing window that are responsive to user input (such as mouse clicks) to direct a user's browser to a second URL. Further illustrative but non-limiting examples can include additional pop-up windows, rotating banners, or the like.

Figure 8:
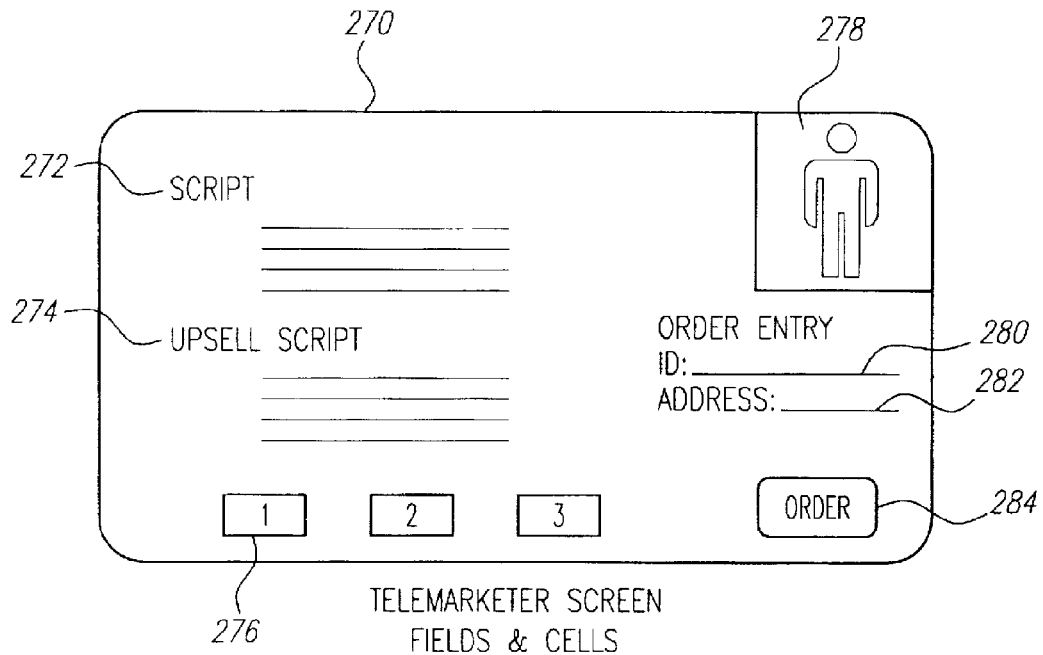
FIG. 8 shows a representative screen display for a telemarketing operator.

The third main component of the upsell consists of the actual offer 350 of the upsell to the user. In the event of a telemarketing upsell offer, the typical mode would include a display on the telemarketers screen of various script or product information 354, which is then provided to the caller. FIG. 8 shows a representative screen for a telemarketer display. The display 270 may include script 272 for use by the telemarketer for interaction with the caller. Specific upsell scripts 274 may be provided, either as a single option for the telemarketer, or to provide multiple options for selection by the telemarketer. Soft keys or icons 276 provide for selective identification of entry by the telemarketer. Various text or numeric based fields 280, 282 may be provided for entry of information, such as order entry, and specifically including identification data 280 and address data 282. This data may be initially provided automatically from the system, for possible confirmation by the telemarketer, or may be initially input by the telemarketer. Optionally, if image information is provided during the transaction, image 278 may be depicted on the display 270. By way of example, if a video phone system is utilized, the image of the caller may be displayed. Additionally, or alternatively, if image or video is provided from the telemarketer to the customer, those images may also appear on the telemarketer's screen 270 in region 278 to provide the telemarketer the same (though possibly in reduced size such as a picture-in-picture) which is simultaneously being provided to the customer. An order entry icon, tab or button bar 284 may be utilized.

The mode or manner of the offer 352 to the customer may also be varied. The customer's prior history or a determined optimum mode or manner of offer based upon customer designation may be utilized. Certain customers or customer designations may be best offered the upsell in a business-like, straight-forward manner, e.g., "We have a special offer for you today . . . ". Other potential customers who have manifested less than an eagerness to be upsold in the past may be initially addressed with a message of an apologetic tone, e.g., "I know you to not typically consider other times, but we have something that we think you will find worth your time to consider . . . ". Yet other presentations may be in a more elaborate or flowery manner, such as in the addition of music, other audio, images, video. The coded designators, or other data regarding the user, may be used in determining the mode or manner of the offer.

If the upsell is consummated 356, the order may be confirmed. That confirmation may be printed, if desired. Further, the customer may be provided with a confirmation number. If a shipping/tracking unit 364 is utilized, the tracking information, and the mode of accessing that system, may be provided to the customer. In the event the upsell offer is not consummated, the user may be offered an alternative upsell 358. The alternative upsell may be determined before the initial upsell, or may be recomputed, wherein one of the inputs to the determination system includes the negative result from the first upsell offer. Optionally, the customer may be queried regarding their reaction, either positive or negative, with respect to the initial upsell offer, so as to provide yet further specific inputs to the upsell determination system.

The system may be modified over time. For example, the success of prior upsells of specific items may be further incorporated in the decision as to the upsell offers 370. This modification of the rules over time may be either done in real time, or on a periodic basis, such as in a batch mode. Further, the system may receive data from users after the receipt and use of their obtained goods or services, such as wherein the customer satisfaction with the goods and services is then incorporated in the decision criteria for the upsell offer.

Figure 7:
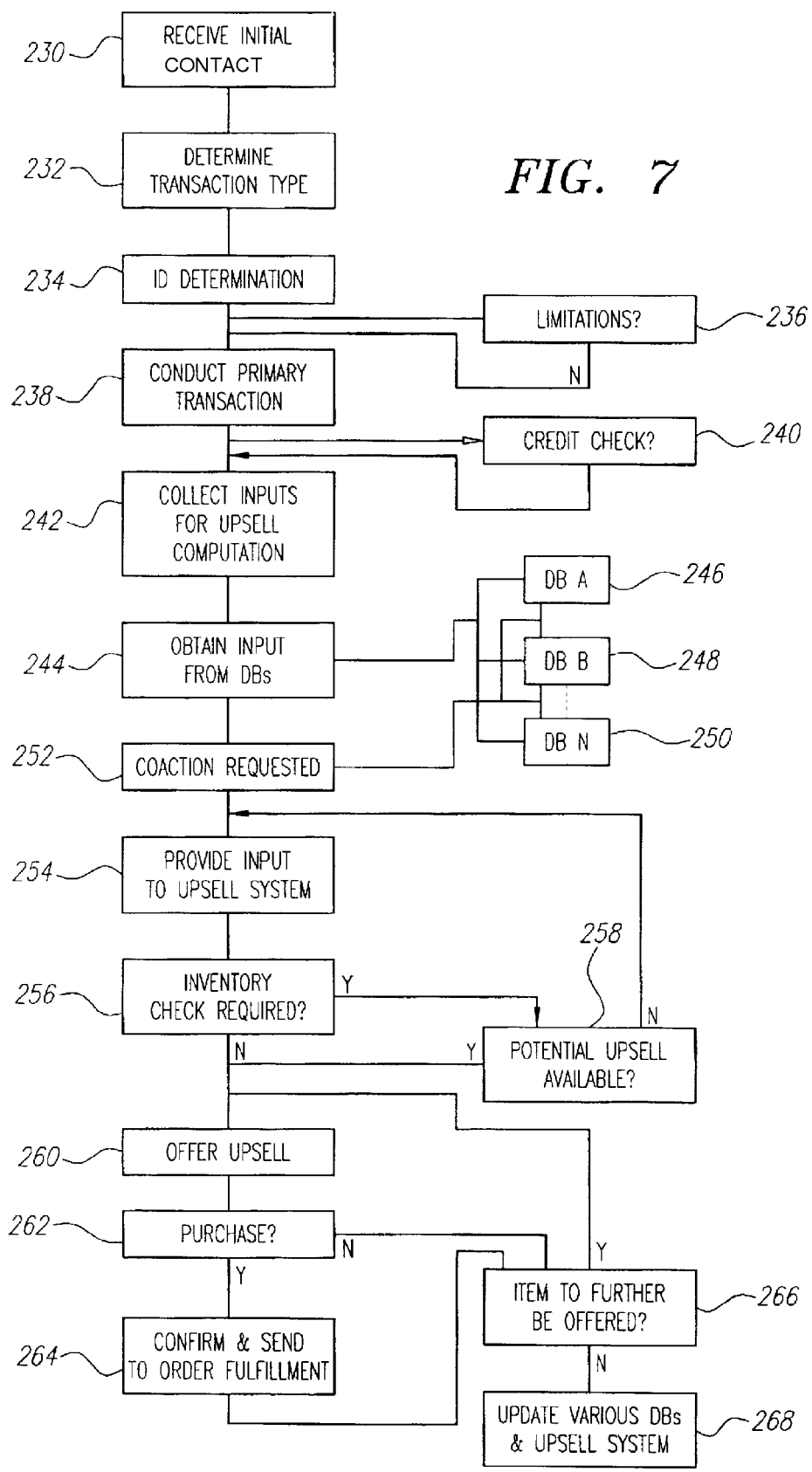
FIG. 7 is a detailed flowchart for one implementation of the methods of these inventions.

FIG. 7 shows a flowchart for one possible path through the system. Upon receiving an initial contact 230, the transaction type may be determined at step 232. Various identification determinations 234 may be collected and then used in determining whether any limitations 236 are to be applied, which if not, the transaction may then be conducted at step 238. Optionally, a credit check 240 may be performed, either for the primary transaction alone, or further, for a potential upsell. The inputs having been collected 242 from prior interaction, database checks 244 may contact and interact with database A 246, database B 248, . . . database N 250, possibly under control when coaction 252 is required. The inputs having been collected are then provided 254 to the system. Optional inventory checks 256 may be performed and then utilized step 258 to determine if the potential upsell item is available. Once the upsell has been determined, the upsell may be offered in step 260, which if purchased at step 262 may then be confirmed and sent to order fulfillment step 264. Optionally, further items may be offered, step 266, in which case the upsell determination may be repeated, or the previously determined second upsell item offered. Typically at the end of the transaction, at step 268 the system will update various databases as appropriate and the upsell system, including the criteria for determining the upsell.

In the offering mode of the website, one variation may include the ability to transfer from the website to a live operator. Such a transfer may be useful wherein the potential customer is interested in obtaining further information regarding the offered product, or has queries which cannot easily be addressed in a web or electronic commerce context. As described in connection with the telemarketing screen, FIG. 8, the screen for the electronic commerce applications may include a display of the live operator, and may also include a display on the live operator console of the customer, if desired.

With regard to the billing system, in one aspect of this invention, it is possible to allocate billing 368 for use of the system. For example, if the primary transaction is financed by company A, and an upsell in the economic interest of company B is successfully effected, piggy-backing on the primary transaction of company A, an accord or allocation may be made between company B and company A regarding payment for the services. Typically, company B would make a contribution to company A, or in some manner reduce the cost for company A to conduct the primary transaction. Consistent with the allocation of expenses between two or more companies, it should be expressly noted that in the upsell system of this invention, the goods or services offered may come from independent sources. That is, the primary transaction may relate to a good or service from company A, and the upsell relate to a good or service from company B, where company A is unaffiliated with company B.

Figure 9:
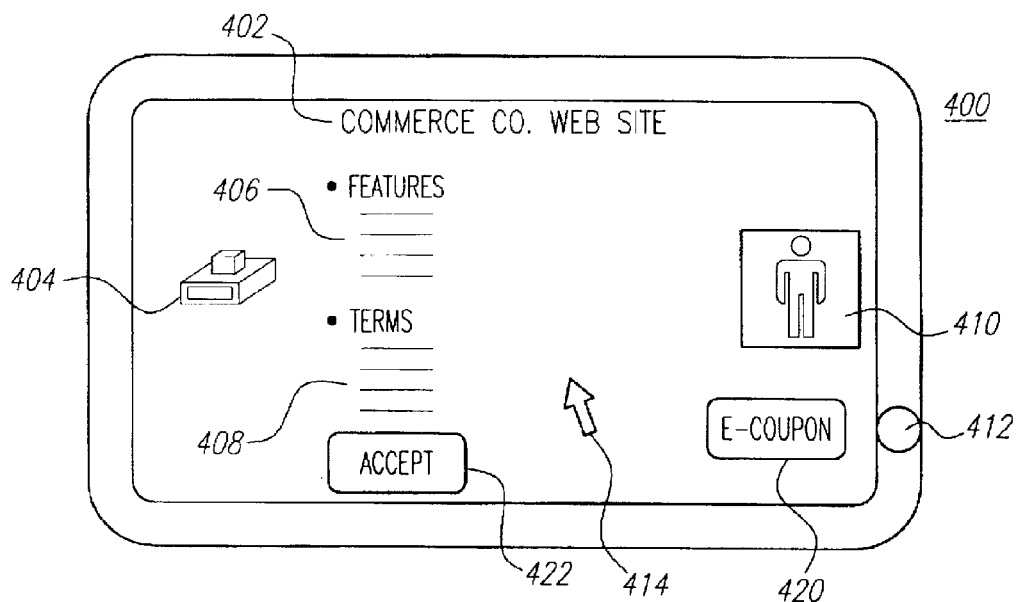
FIG. 9 shows a exemplary display for a Internet-based display.

FIG. 9 shows a highly simplified depiction of a display such as used in one implementation of a electronic commerce application utilizing the inventions of this system. The overall display 400 may include textual information 402 identifying the affiliation of the provider of the good or service. A graphical depiction 404 of the good or service may be provided, which is either a still image or includes motion. Information regarding features 406 may be provided as well as may be the terms 408 of sale, lease or other interchange. Optionally, a display 410 provides a video feed such as from a telemarketing or other operator assisting the user, or provides a created image regarding a assistant for the transaction. Speakers 412 may be optionally utilized to provide audio information, either being one-way communication or two-way communication. Typically, some sort of a pointer 414 is displayed on screen 400 to designate the area of data for entry. For example, an acceptance 422 region may be clicked, or double clicked as required, to accept an offer. Optionally, an electronic coupon 420 or other form of coupon may be provided to the user in a real time manner for later use. The coupon may be for a discount on a later purchase, or may otherwise be a form of incentive to the customer, such as the award of credits which may be accumulated for exchange into other goods or services.

Figure 10:
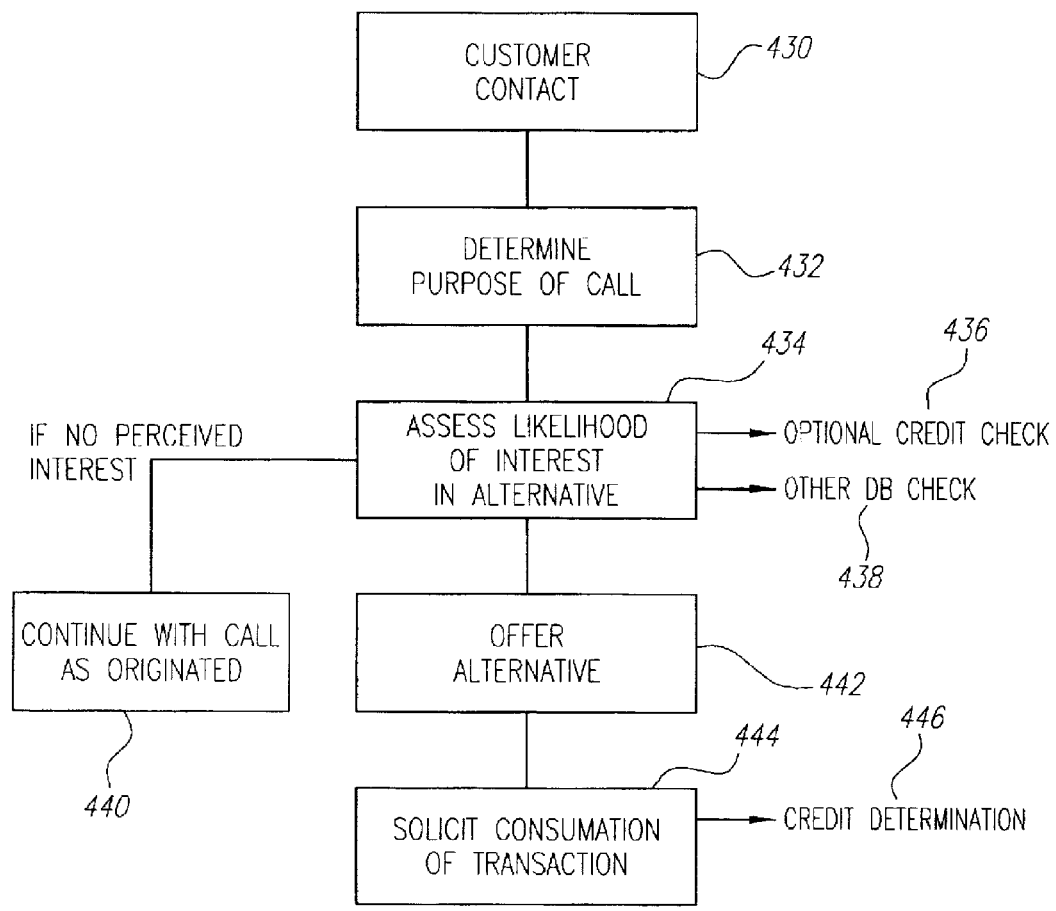
FIG. 10 shows a flowchart for a customer service application.

FIG. 10 shows a high level flowchart for a customer service operation. Upon customer contact 430, the purpose of the call 432 may be determined. The purpose may be determined such as from knowledge of DNIS as indicating a customer service number, or by response by the customer to queries, such as from a live operator or interactive voice response system (e.g., press 1 for purchase, press 2 for service . . . ). Decision block 434 optionally provides a preliminary assessment of the likelihood of interest in an upsell or alternative presentation. In the event an offer is to be made, checks such as a credit check 436 or other database check 438 may be made. The input data is then provided to a processing, upsell system (as described previously) from which an alternative 442 may be generated and offered. The system may optionally then solicit consummation of the transaction 444, and may, if required, again access for credit determination 446. In the event that it is perceived at decision block 434 that no interest exists in an upsell, the system may continue with the call as originated 440. By way of example, assume that a user calls a service number regarding an integrated cellular phone and paging system. The system may obtain the ANI (or mobile identification number) and determine based upon the DNIS that a particular customer is calling a service number. After optionally confirming that the call relates to the repair of the phone/pager associated with the ANI or MIN, the system may determine that this product is sufficiently old that an upsell should be offered for a replacement item. By accessing a database, such as the cellular systems local database, it may be determined that the caller has a now supplanted model of phone, and possesses sufficient credit worthiness to purchase a new system. At that point, the system may offer the caller a purchase option for the replacement item, thereby effecting an upsell from one transaction type, namely, a service contact, into a separate type of transaction, such as a purchase transaction of a replacement or superior item. In this way, an upsell is effected.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

What is claimed is:

1. A method for providing real-time offers to a user of an electronic communication device comprising:
    obtaining data of a transaction initiated by a user for a purchase of a first good or service upon receiving a search for the first good or service in a search engine, the data relating to an identity of the user;
    during the course of the user initiated transaction for the first good or service, determining at least one good or service currently possessed by the user; and
    generating, by a computer, an offer for sale of a second good or service to the user based on the data relating to an identity of the user and an obsolescence of the at least one good or service possessed by the user, wherein obsolescence is measured by passage of time.

2. The method of claim 1, wherein obtaining data of a transaction comprises:
    determining a type of the transaction; and
    determining the identity of the user.

3. The method of claim 2, further comprising:
    determining if a limitation is placed on the user based on the identity; and
    conducting the transaction if no restriction is placed on the identity.

4. The method of claim 1, wherein generating an offer for sale of a second good or service to the user comprises:
    performing an inventory check to determine if a second product or service is available.

5. The method of claim 1, further comprising:
    determining if a purchase of the second good or service is made by the user; and
    confirming the purchase and sending the purchase to an order fulfillment system if the purchase is made.

6. The method of claim 5, further comprising:
    determining whether to generate an offer for sale of a further product or service; and
    updating at least one database with a criteria used in determining whether to generate an offer for sale.

7. The method of claim 1, wherein obtaining data of a transaction comprises:
    receiving the data at the search engine; and
    processing the transaction.

8. The method of claim 1, wherein generating an offer for sale of a second good or service to the user based on the data comprises:
    comparing the data with data of at least one of a Website database or a remote database.

9. A system for providing real-time offers to users of a system, comprising:
    an interface configured to receive a transaction from a user for purchase of a first good or service based on a search conducted using a search engine; and
    an upsell system configured to:
    determine during the course of the transaction, at least one good or service currently possessed by the user;
    determine at least one offer for sale of a second good or service for the user based on the data of the transaction relating to the user and an obsolescence of the at least one good or service possessed by the user, wherein obsolescence is based on a passage of time; and
    provide the offer for sale of the second good or service to the user during a course of the transaction for the first good or service.

10. The system of claim 9, further comprising an identification data unit to obtain the identity of the user and of the first good or service for purchase in the transaction.

11. The system of claim 10, wherein the identity of the user is obtained from at least one of a contact between the user and the search engine, a registration by the user, or a verification by the user.

12. The system of claim 10, wherein the identification data unit is configured to obtain the identity automatically or non-automatically.

13. The system of claim 12, wherein the identification data unit is configured to obtain the identity automatically from an automatic name identification of the user.

14. The system of claim 12, wherein the identification data unit is configured to obtain the identity non-automatically from at least one data entry by the user.

15. The system of claim 9, further comprising a possession database configured to store data related to the first good or service.

16. The system of claim 10, further comprising a database coupled to the upsell system, wherein the database is configure to store the data relating to the user.

17. The system of claim 10, wherein the at least one possessed good or service is a prior purchase by the user.

18. The system of claim 17, wherein the obsolescence of the at least one possessed good or service is part of historical data of the prior purchase.

19. The system of claim 10, wherein the offer for sale is specific to the user.

20. The system of claim 9, wherein the upsell system is further configured to collect data of the transaction relating to the user and the first user.

* * * * *